(12) United States Patent
Vetro et al.

(10) Patent No.: US 6,574,279 B1
(45) Date of Patent: Jun. 3, 2003

(54) VIDEO TRANSCODING USING SYNTACTIC AND SEMANTIC CLUES

(75) Inventors: Anthony Vetro, Staten Island, NY (US); Ajay Divakaran, Denville, NJ (US); Huifang Sun, Cranbury, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/547,159

(22) Filed: Apr. 11, 2000

Related U.S. Application Data

(63) Continuation-in-part of application No. 09/504,323, filed on Feb. 14, 2000, which is a continuation-in-part of application No. 09/496,706, filed on Feb. 2, 2000.

(51) Int. Cl.[7] .................................................. H04N 7/18
(52) U.S. Cl. ............................ 375/240.3; 375/240.08; 375/240.1
(58) Field of Search ........................... 375/240.01–240.29

(56) References Cited

U.S. PATENT DOCUMENTS

| | | | |
|---|---|---|---|
| 6,236,395 B1 | * 5/2001 | Sezan et al. | 345/723 |
| 6,298,071 B1 | * 10/2001 | Taylor et al. | 370/412 |
| 6,332,144 B1 | * 12/2001 | deVries et al. | 707/102 |
| 6,345,279 B1 | * 2/2002 | Li et al. | 707/10 |
| 6,430,558 B1 | * 8/2002 | Delano | 707/10 |

OTHER PUBLICATIONS

"Coding of Moving Pictures and Audio"; International Organization for Standardization; ISO/IEC JTC1/SC29/WG11, MPEG99/N3130, Dec. 1999/Maui, HI.

"Coding of Moving Pictures and Associated Audio"; International Organization for Standardization; ISO/IEC JTC1/SC29/WG11/, MPEG99/N3126, Dec. 1999/Maui, HI.

"Coding of Moving Pictures and Audio"; International Organization for Standardization; ISO/IEC JTC1/SC29/WG11/N3113, Dec. 1999/Maui, HI.

* cited by examiner

*Primary Examiner*—Andy Rao
(74) *Attorney, Agent, or Firm*—Dirk Brinkman

(57) ABSTRACT

A method for transcoding a compressed video partitions the compressed video into hierarchical levels, and extracts features from each of the hierarchical levels. One of a number of conversion modes of a transcoder is selected dependent on the features extracted from the hierarchical levels. The compressed video is then transcoded according to the selected conversion mode.

26 Claims, 14 Drawing Sheets

| Class | Descriptor |
|---|---|
| 1 | Easy to Compress |
| 2 | Moderate to Compress |
| 3 | Difficult to Compress |

FIG. 11B

| Descriptor |
|---|
| Spatial Quality less than Temporal Quality |
| Spatial Quality greater than Temporal Quality |
| Spatial Quality equals Temporal Quality |

FIG. 11A

VIDEO TRANSCODING USING SYNTACTIC AND SEMANTIC CLUES

CROSS-REFERENCE TO RELATED APPLICATION

This is a Continuation-in Part U.S. patent application of U.S. patent application Ser. No. 09/504,323, "Object-Based Bitstream Transcoder" filed, " filed on Feb. 14, 2000 by Vetro et al., a Continuation-in Part U.S. Patent Application of U.S. patent application Ser. No. 09/496,706, "Adaptable Compressed Bitstream Transcoder" filed," filed on Feb. 2, 2000 by Vetro et al.

FIELD OF THE INVENTION

This invention relates generally to information delivery systems, and more particularly to delivery systems that adapt information to available bit rates of a network.

BACKGROUND OF THE INVENTION

Recently, a number of standards have been developed for communicating encoded information. For video sequences, the most widely used standards include MPEG-1 (for storage and retrieval of moving pictures), MPEG-2 (for digital television) and H.263, see ISO/IEC JTC1 CD 11172, MPEG, "Information Technology—Coding of Moving Pictures and Associated Audio for Digital Storage Media up to about 1.5 Mbit/s—Part 2: Coding of Moving Pictures Information," 1991, LeGall, "MPEG: A Video Compression Standard for Multimedia Applications," Communications of the ACM, Vol. 34, No. 4, pp. 46–58, 1991, ISO/IEC DIS 13818-2, MPEG-2, "Information Technology—Generic Coding of Moving Pictures and Associated Audio Information—Part 2: Video," 1994, ITU-T SG XV, DRAFT H.263, "Video Coding for Low Bitrate Communication," 1996, ITU-T SG XVI, DRAFT13 H.263+Q15-A-60 rev.0, "Video Coding for Low Bitrate Communication," 1997.

These standards are relatively low-level specifications that primarily deal with the spatial and temporal compression of video sequences. As a common feature, these standards perform compression on a per frame basis. With these standards, one can achieve high compression ratios for a wide range of applications.

Newer video coding standards, such as MPEG-4 (for multimedia applications), see "Information Technology—Generic coding of audio/visual objects," ISO/IEC FDIS 14496-2 (MPEG4 Visual), November 1998, allow arbitrary-shaped objects to be encoded and decoded as separate video object planes (VOP). The objects can be visual, audio, natural, synthetic, primitive, compound, or combinations thereof. Video objects are composed to form compound objects or "scenes."

The emerging MPEG-4 standard is intended to enable multimedia applications, such as interactive video, where natural and synthetic materials are integrated, and where access is universal. MPEG-4 allows for content based interactivity. For example, one might want to "cut-and-paste" a moving figure or object from one video to another. In this type of application, it is assumed that the objects in the multimedia content have been identified through some type of segmentation process, see for example, U.S. patent application Ser. No. 09/326,750 "Method for Ordering Image Spaces to Search for Object Surfaces" filed on Jun. 4, 1999 by Lin et al.

In the context of video transmission, these compression standards are needed to reduce the amount of bandwidth (available bit rate) that is required by the network. The network can represent a wireless channel or the Internet. In any case, the network has limited capacity and a contention for its resources must be resolved when the content needs to be transmitted.

Over the years, a great deal of effort has been placed on architectures and processes that enable devices to transmit the content robustly and to adapt the quality of the content to the available network resources. When the content has already been encoded, it is sometimes necessary to further convert the already compressed bitstream before the stream is transmitted through the network to accommodate, for example, a reduction in the available bit rate.

Bit stream conversion or "transcoding" can be classified as bit rate conversion, resolution conversion, and syntax conversion. Bit rate conversion includes bit rate scaling and conversion between a constant bit rate (CBR) and a variable bit rate (VBR). The basic function of bit rate scaling is to accept an input bitstream and produce a scaled output bitstream, which meets new load constraints of a receiver. A bit stream scaler is a transcoder, or filter, that provides a match between a source bitstream and the receiving load.

As shown in FIG. 1, typically, scaling can be accomplished by a transcoder 100. In a brute force case, the transcoder includes a decoder 110 and encoder 120. A compressed input bitstream 101 is fully decoded at an input rate Rin, then encoded at a new output rate Rout 102 to produce the output bitstream 103. Usually, the output rate is lower than the input rate. However, in practice, full decoding and full encoding in a transcoder is not done due to the high complexity of encoding the decoded bitstream.

Earlier work on MPEG-2 transcoding has been published by Sun et al., in "Architectures for MPEG compressed bitstream scaling," IEEE Transactions on Circuits and Systems for Video Technology, April 1996. There, four methods of rate reduction, with varying complexity and architecture, were presented.

FIG. 2 shows an example method. In this architecture, the video bitstream is only partially decoded. More specifically, macroblocks of the input bitstream 201 are variable-length decoded (VLD) 210. The input bitstream is also delayed 220 and inverse quantized (IQ) 230 to yield discrete cosine transform (DCT) coefficients. Given the desired output bit rate, the partially decoded data are analyzed 240 and a new set of quantizers is applied at 250 to the DCT blocks.

These re-quantized blocks are then variable-length coded (VLC) 260 and a new output bitstream 203 at a lower rate can be formed. This scheme is much simpler than the scheme shown in FIG. 1 because the motion vectors are re-used and an inverse DCT operation is not needed.

More recent work by Assuncao et al., in "A frequency domain video transcoder for dynamic bit-rate reduction of MPEG-2 bitstreams," IEEE Transactions on Circuits and Systems for Video Technology, pp. 953–957, December 1998, describe a simplified architecture for the same task. They use a motion compensation (MC) loop, operating in the frequency domain for drift compensation. Approximate matrices are derived for fast computation of the MC blocks in the frequency domain. A Lagrangian optimization is used to calculate the best quantizer scales for transcoding.

Other work by Sorial et al, "Joint transcoding of multiple MPEG video bitstreams," Proceedings of the International Symposium on Circuits and Systems, Can 1999, presents a method of jointly transcoding multiple MPEG-2 bitstreams, see also U.S. patent application Ser. No. 09/410,552 "Estimating Rate-Distortion Characteristics of Binary Shape Data," filed Oct. 1, 1999 by Vetro et al.

According to prior art compression standards, the number of bits allocated for encoding texture information is controlled by a quantization parameter (QP). The above papers are similar in that changing the QP based on information that is contained in the original bitstream reduces the rate of texture bits. For an efficient implementation, the information is usually extracted directly in the compressed domain and can include measures that relate to the motion of macroblocks or residual energy of DCT blocks. This type of analysis can be found in the bit allocation analyzer.

Although in some cases, the bitstream can be preprocessed, it is still important that the transcoder operates in real-time. Therefore, significant processing delays on the bitstream cannot be tolerated. For example, it is not feasible for the transcoder to extract information from a group of frames and then to transcode the content based on this look-ahead information. This cannot work for live broadcasts, or video conferencing. Although it is possible to achieve better transcoding results in terms of quality due to better bit allocation, such an implementation for real-time applications is impractical.

It is also important to note that classical methods of transcoding are limited in their ability to reduce the bit rate. In other words, if only the QP of the outgoing video is changed, then there is a limit to how much one can reduce the rate. The limitation in reduction is dependent on the bitstream under consideration. Changing the QP to a maximum value will usually degrade the content of the bitstream significantly. Another alternative to reducing the spatial quality is to reduce the temporal quality, i.e., drop or skip frames. Again, skipping too many frames will also degrade the quality significantly. If both reductions are considered, then the transcoder is faced with a trade-off in spatial versus temporal quality.

This concept of such a spatio-temporal trade-off can also be considered in the encoder. However, not all video-coding standards support frame skipping. For example, in MPEG-1 and MPEG-2, the Group of Picture (GOP) structure is pre-determined, i.e., the Intra frame period and distance between anchor frames is fixed. As a result, all pictures must be encoded. To get around this temporal constraint, the syntax does allow macroblocks to be skipped. If all macroblocks in a frame are skipped, then the frame has essentially been skipped. At least one bit is used for each macroblock in the frame to indicate this skipping. This can be inefficient for some bit rates.

The H.263 and MPEG-4 standards do allow frame skipping. Both standards support a syntax that allows the a reference to be specified. However, there frame skipping has mainly been used to satisfy buffer constraints. In other words, if the buffer occupancy is too high and in danger of overflow, then the encoder will skip a frame to reduce the flow of bits into the buffer and give the buffer some time to send its current bits.

A more sophisticated use of this syntax allows one to make the spatio-temporal trade-offs in non-emergency situations, i.e., code more frames at a lower spatial quality, or code less frames at a higher spatial quality. Depending on the complexity of the content, either strategy can potentially lead to better overall quality. Methods to control this trade-off in an MPEG-4 object-based encoder have been described in U.S. Pat. No. 5,969,764, "Adaptive video coding method", issued on Oct. 19, 1999 to Sun et al., and in "MPEG-4 rate control for multiple video objects," IEEE Trans. on Circuits and Systems for Video Technology, February 1999, by Vetro et al. There, two modes of operation were introduced, HighMode and LowMode. Depending on a current mode of operation, which was determined by the outgoing temporal resolution, adjustments in the way bits were allocated were made.

Besides the work referenced above, methods to control this spatio-temporal trade-off have received minimal attention. Furthermore, the information that is available in the transcoder to make such decisions is quite different than that of the encoder. In the following, methods for making such trade-offs in the transcoder are described.

As a result, the transcoder must find some alternate means of transmitting the information that is contained in a bitstream to adapt to reductions in available bit rates.

The most recent standardization effort taken on by the MPEG standard committee is that of MPEG-7, formally called "Multimedia Content Description Interface," see "MPEG-7 Context, Objectives and Technical Roadmap," ISO/IEC N2861, July 1999. Essentially, this standard plans to incorporate a set of descriptors and description schemes that can be used to describe various types of multimedia content. The descriptor and description schemes are associated with the content itself and allow for fast and efficient searching of material that is of interest to a particular user. It is important to note that this standard is not meant to replace previous coding standards, rather, it builds on other standard representations, especially MPEG-4, because the multimedia content can be decomposed into different objects and each object can be assigned a unique set of descriptors. Also, the standard is independent of the format in which the content is stored.

The primary application of MPEG-7 is expected to be search and retrieval applications, see "MPEG-7 Applications," ISO/IEC N2861, July 1999. In a simple application environment, a user can specify some attributes of a particular object. At this low-level of representation, these attributes can include descriptors that describe the texture, motion and shape of the particular object. A method of representing and comparing shapes has been described in U.S. patent application Ser. No. 09/326,759 "Method for Ordering Image Spaces to Represent Object Shapes" filed on Jun. 4, 1999 by Lin et al., and a method for describing the motion activity has been described in U.S. patent application Ser. No. 09/406,444 "Activity Descriptor for Video Sequences" filed on Sept. 27, 1999 by Divakaran et al. To obtain a higher-level of representation, one can consider more elaborate description schemes that combine several low-level descriptors. In fact, these description schemes can even contain other description schemes, see "MPEG-7 Multimedia Description Schemes WD (V1.0)," ISO[IEC N3113, December 1999 and U.S. patent application Ser. No. 09/385, 169 "Method for representing and comparing multimedia content," filed Aug. 30, 1999 by Lin et al.

These descriptors and description schemes that will be provided by the MPEG-7 standard allow one access to properties of the video content that cannot be derived by a transcoder. For example, these properties can represent look-ahead information that was assumed to be inaccessible to the transcoder. The only reason that the transcoder has access to these properties is because the properties have been derived from the content earlier, i.e., the content has been pre-processed and stored in a database with its associated meta-data.

The information itself can be either syntactic or semantic, where syntactic information refers to the physical and logical signal aspects of the content, while the semantic information refers to the conceptual meaning of the content. For a video sequence, the syntactic elements can be related to the color, shape and motion of a particular object. On the other hand, the semantic elements can refer to information that cannot be extracted from low-level descriptors, such as the time and place of an event or the name of a person in a video sequence.

Given the background on traditional methods of transcoding and the current status of the MPEG-7 standard, there exists a need to define an improved transcoding system that utilizes information from both sides.

SUMMARY OF THE INVENTION

A method for transcoding a compressed video partitions the compressed video into hierarchical levels, and extracts features from each of the hierarchical levels. One of a number of conversion modes of a transcoder is selected dependent on the features extracted from the hierarchical levels. The compressed video is then transcoded according to the selected conversion mode.

BRIEF DESCRIPTION OF THE DRAWINGS

FIG. 11a–b are block diagrams of descriptor schemes;

FIG. 12a is a block diagram of transcoding according to the descriptor schemes of FIG. 11a;

DETAILED DESCRIPTION OF PREFERRED EMBODIMENTS

Introduction

Figure 1:
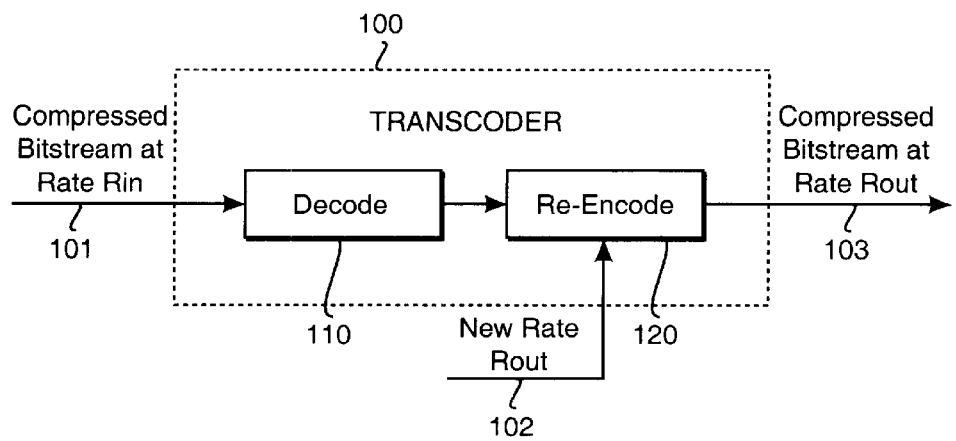
FIG. 1 is a block diagram of a prior art transcoder.
Figure 2:
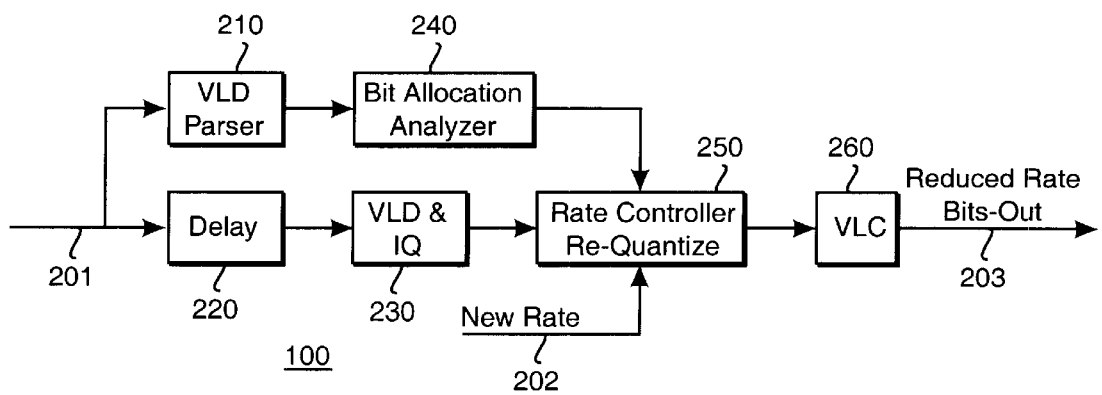
FIG. 2 is a block diagram of a prior art partial decoder/encoder.

We describe a video delivery system that is capable of converting, or "scaling," a compressed input bitstream to a compressed output bitstream at a target rate, i.e., an available bit rate (ABR) of a network. We also describe a delivery system that delivers variations of the compressed input bitstream. Furthermore, we describe transcoding based on low-level features and descriptor schemes of bitstreams.

Usually the target rate of the output bitstream is less than the rate of the input bitstream. In other words, the task of our transcoder is to further compress the bitstream, usually due to constraints in network resources or receiver load in an end-user device. We describe content-based transcoding techniques for various levels of a video; the levels including a program level, a shot level, a frame level and video object level, and a sub-region level. It is our goal to perform transcoding while maximizing rate-quality (RQ) characteristics.

Our system is capable of overcoming the drawbacks of conventional transcoders, namely limitations in rate conversion, particularly in real-time applications. Although conventional transcoding techniques can sufficiently reduce the rate, the quality of the content is usually severely degraded. Often, the information that is conveyed in the reduced bit rate bitstream is lost altogether. Conventionally, bitstream "quality" is measured as bit-by-bit differences between the input and output bitstreams.

We describe transcoding techniques that are able to achieve the target rate while maintaining the quality of the content of the bitstream.

Continuous Conversion

Conventional frame-based transcoding techniques can be defined as continuous-conversions. Because conventional techniques attempt to continuously maintain the best trade-off in spatial vs. temporal quality, the output is always a sequence of frames that best represents the input sequence. When a particular frame is skipped to meet constraints on the rate, the information that is contained within the skipped frame is not considered. If enough frames are skipped, then the bitstream that is received is meaningless to a user, or at the very best, less than satisfactory.

Quality Distortion Metrics

A conventional continuous-conversion transcoder makes optimal decisions in the rate-distortion sense with regard to trade-offs in spatial and temporal quality. In such a transcoder, the distortion is usually taken to be any classic distortion metric, such as the peak signal to noise ratio (PSNR). It should be emphasized that in such a conversion, the distortion is not a measure of how well the content of the bitstream is being conveyed, but rather of the bit-to-bit differences between the original input bitstream and the reconstructed output bitstream, i.e., the quality.

Fidelity of Bitstream

In one embodiment for transcoding a bitstream sequence under low bit rate constraints, we summarize the content of the bitstream with a small number of frames. In this way, we do not use the classic distortion metrics focused on quality. Rather, we adopt a new measure we call "fidelity." Fidelity takes into consideration the semantics and syntax of the content. By the semantics and syntax, we do not mean the bits or pixels, but rather humanly meaningful concepts represented by the bits, for example, words, sounds, level of humor and action of videos, video objects, and the like.

Fidelity can be defined in a number of ways. However fidelity, as we define it, is not related to conventional quantitative quality, e.g., the bit-by-bit differences. Rather, our fidelity measures the degree to which a frame or any number of frames conveys the information contained in the original image sequence, i.e., the content or higher level meaning of the information that is conveyed, and not the raw bits.

Discrete-Summary Transcoder

Fidelity is a more subjective or semantic measure than conventional distortion metrics. However, in our system, fidelity is a useful measure to gauge the non-conventional transcoder's performance. Because the output of our transcoder according to one embodiment is a finite set of relatively high quality frames that attempt to summarize the entire sequence of bits, we refer to this type of transcoder as a "discrete-summary transcoder."

For example, at low bit rates, we choose a small number of high quality frames to represent the video. In this way the semantic "meaning" of the bitstream is preserved. It can be stated that this discrete-summary transcoder performs a high-level semantic sampling of the input bitstream, whereas continuous transcoders only sample pixels quantitatively in the spatial and temporal domains. In situations where the bit rate is severely limited, we sample "rich" frames to preserve the fidelity of the content encoded in the bitstream.

Because we selectively sample rich frames, we can lose one aspect in the bitstream—motion. Preferably, we resort to discrete-summary transcoding only when the rate-distortion performance of the continuous-conversion transcoder is severely degraded or cannot meet the target rate. Under these conditions, conventional continuous-conversion transcoders lose fluid motion because the frame rate is so low that the rate of information delivery becomes jerky and disturbing to the user.

The major gain of discrete-summary transcoding over conventional continuous-conversion transcoding is that discrete-summary transcoders attempts to choose frames that are rich in information, whereas continuous-conversion transcoders under severe rate constraints will drop frames that are rich in information.

In order to control which transcoder is best for the given situation, we describe a content-network-device (CND) manager. The purpose of the CND manager is to select which transcoder to use. The selection is based on data obtained from content, network, user device characteristics. We can also simulate these device characteristics in an "off-line" mode to generate variations of bitstream for later delivery.

Adaptable Bitstream Delivery System

Figure 3:
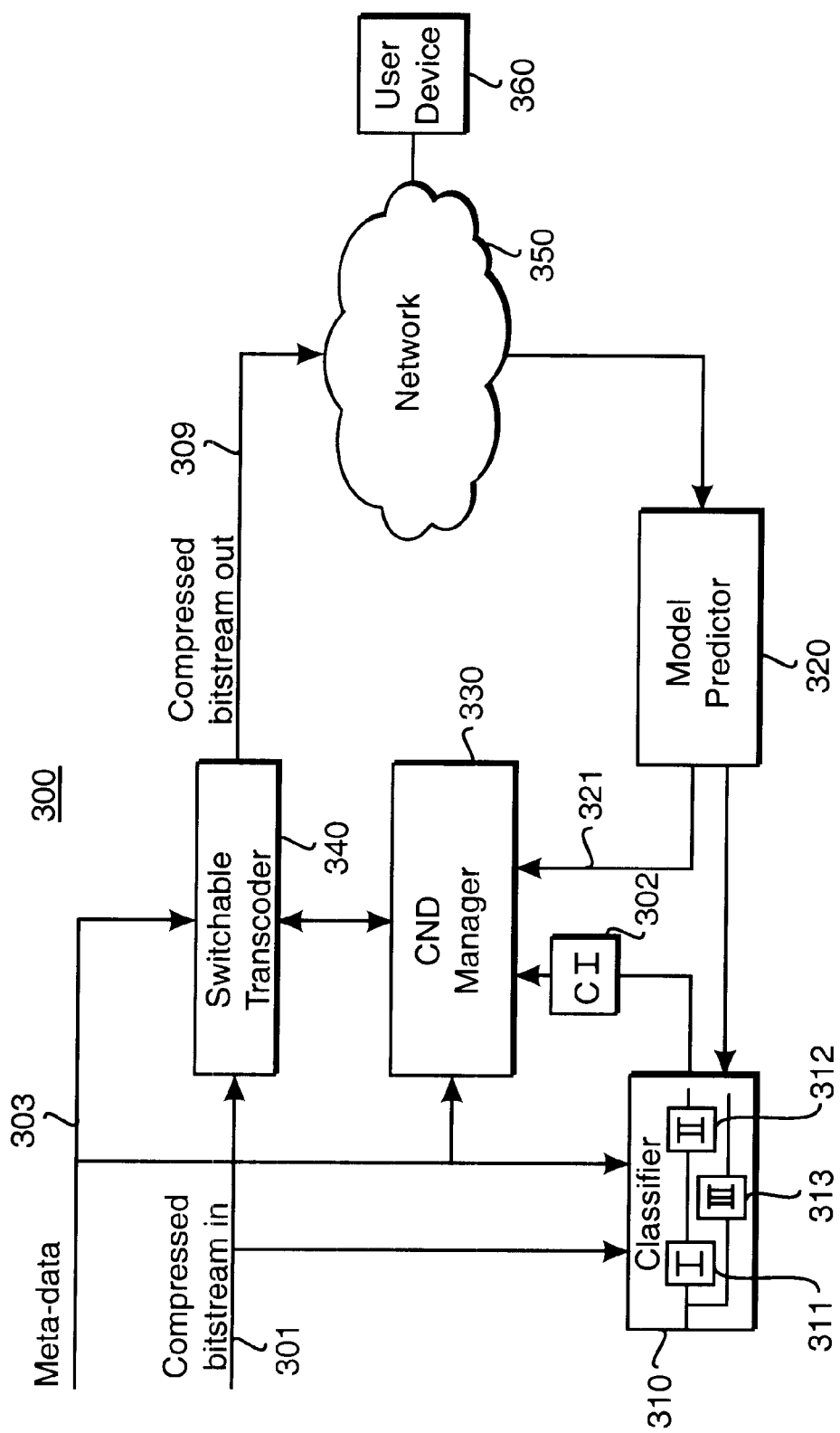
FIG. 3 is a block diagram of an adaptable bitstream delivery system according.

As shown in FIG. 3, an adaptable bitstream delivery system 300 includes four major components: a content classifier 310, a model predictor 320, a content-network-device manager 330 and a switchable transcoder 340.

The goal of the system 300 is to deliver a compressed bitstream 301 with information content through a network 350 to a user device 360. The content of the bitstream can be visual, audio, textual, natural, synthetic, primitive, data, compound or combinations thereof. The network can be wireless, packet-switched, or other networks with unpredictable operational characteristic. The user device can be a video receiver, a wireless receiver stationary or mobile, or other like user devices with internal resource constraints that may make quality reception of the bitstream difficult.

As an advantage, the system maintains the semantic fidelity of the content even when the bitstream needs to be further compressed to meet network and user device characteristics.

The input compressed bitstream is directed to the transcoder and the content classifier. The transcoder can ultimately reduce the rate of an output compressed bitstream 309 directed through the network at the user device.

The content classifier 310 extracts content information (CI) 302 from the input bitstream for the manager. The main function of the content classifier is to map semantic features of content characteristics, such as motion activity, video change information and texture, into a set of parameters that are used to make rate-quality trade-offs in the content-network manager. To assist with this mapping function, the content classifier can also accept meta-data information 303. The meta-data can be low-level and high-level. Examples of meta-data include descriptors and description schemes that are specified by the emerging MPEG-7 standard.

In this architecture, the model predictor 320 provides real-time feedback 321 regarding the dynamics of the network 350, and possible constraining characteristics of the user device 360. For example, the predictor reports network congestion and available bit rate (ABR). The predictor also receives and translates feedback on packet loss ratios within the network. The predictor estimates a current network state, and long-term network predictions 321. Characteristically, the user device can have limited resources. For example, processing power, memory, and display constraints. For example, if the user device is a cellular telephone, then the display can be constrained to textual information or low-resolution images, or even worse, only audio. These characteristics can also impact the selection of a transcoding modality.

In addition to receiving the meta-data 303, the manager 330 also receives input from both the content classifier 310 and the model predictor 320. The CND combines output data from these two sources of information together so that an optimal transcoding strategy is determined for the switchable transcoder 340.

Content Classifier

In the field of pattern analysis and recognition, classification can be achieved by extracting features from various levels of the video. For example, program features, shot features, frame features, and features of sub-regions within frames. The features themselves can be extracted using sophisticated transforms or simple local operators. Regardless of how the features are extracted, given a feature space of dimension N, each pattern can be represented as a point in this feature space.

It is customary to subject a variety of different training patterns as input to this extraction process and to plot the outcomes in feature space. Provided that the feature set and training patterns are appropriate, we observe several clusters of points called "classes." These classes allow us to distinguish different patterns and group similar patterns, and to determine boundaries between the observed classes. Usually, the boundaries between classes adhere to some cost for misclassification and attempt to minimize the overall error.

After appropriate classes have been identified and suitable boundaries between the classes have been drawn, we can quickly classify new patterns in the bitstream. Depending on the problem, this can be accomplished with a neural network or other known classification techniques such as Support Vector Machines, see Cristianini et al. in "An Introduction to Support Vector Machines, (and other kernel-based learning methods)," Cambridge University Press, 2000.

The content classifier 310 operates in three stages (I, II, and III 311–313). First, we classify the bitstream content so that higher-level semantics can be inferred, and second, we adapt the classified content to network and user device characteristics.

In the first stage (I) 311, we extract a number of low-level features from the compressed bitstream using conventional techniques, for example, motion activity, texture, or DCT coefficients. We can also access the meta-data 303, such as MPEG-7 descriptors and description schemes. If the meta-data are available, then less work needs to be performed on the compressed bitstream. As a final outcome of this first stage, a pre-determined set of content features are mapped to a finite set of semantic classes or high-level meta-data. Furthermore, within each semantic class, we differentiate based on the coding complexity, i.e., the complexity is conditional on the semantic class and network characteristics, and possibly device characteristics.

This high-level understanding of the content is passed onto the CND manager 330 as content information (CI) 302. The CI 302, in part, characterizes the potential performance of this embodiment of the switchable transcoder.

The above classification is useful in terms of content understanding, and, ultimately discrete-summary transcoding, but it is also useful as an intermediate stage result. Essentially, we have a new set of classes that serve as input to the second stage II 312 of classification. In the second stage of classification, we map our semantic classes to features of network and device characteristics. These features will help us to determine the characteristics of rate-quality functions that assist the system in developing a transcoding strategy. In other words, if it is probable that a certain semantic class is characterized by bursty data due to object movement or video changes, then this should be accounted for when estimating how much resource the network should provide. The third stage 313 is described below with respect to other embodiments.

Content-Network-Device Manager

Figure 4:
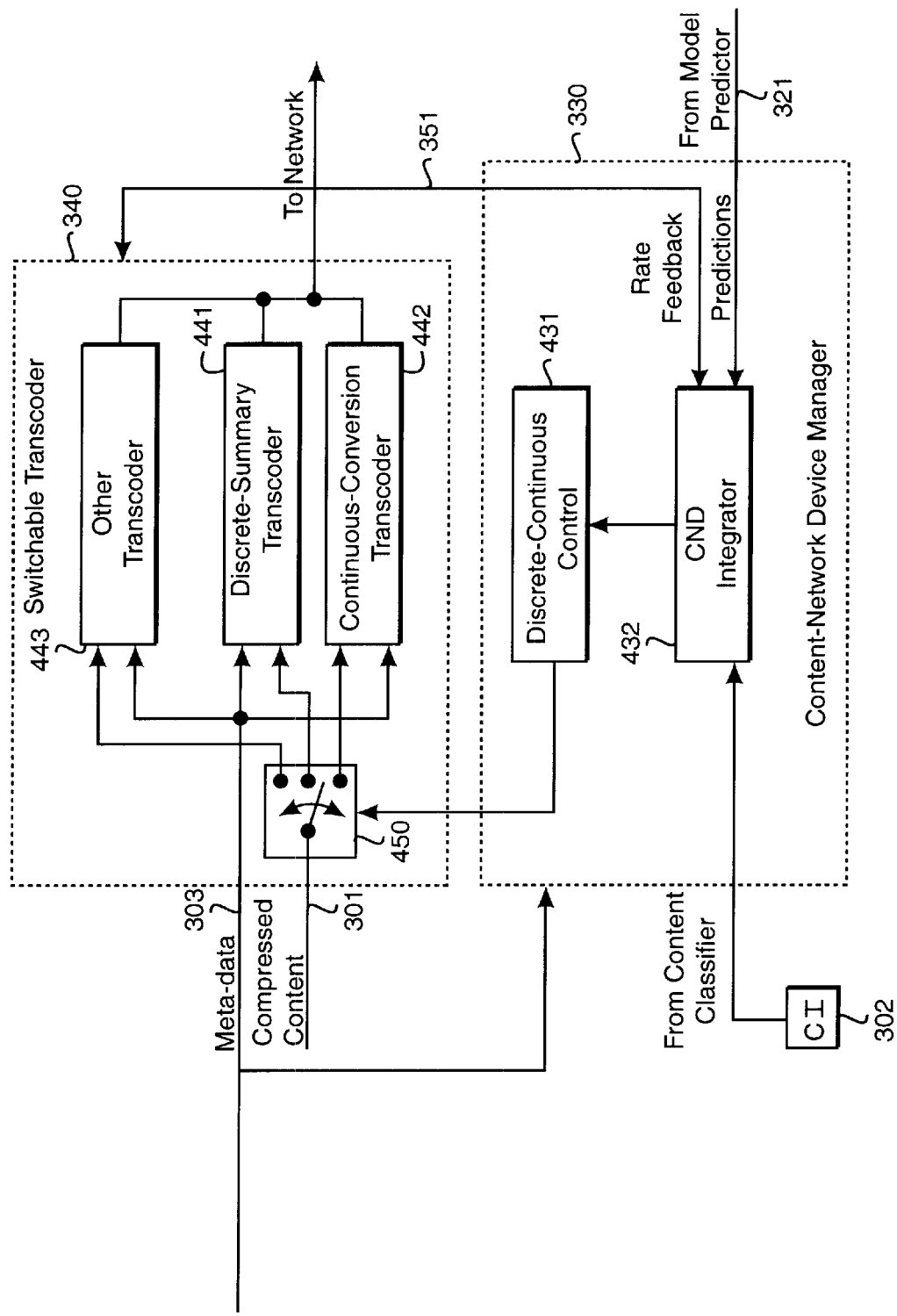
FIG. 4 is a block diagram of an adaptable transcoder and transcoder manager.

The content-network-device (CND) manager 330 and transcoder 340 are shown in greater detail in FIG. 4. The CND manager includes a discrete-continuous control 431 and a content-network-device (CND) integrator 432. The transcoder 340 includes a plurality of transcoder 441–443.

The control 431, using a switch 450, is responsible for deciding how the input compressed bitstream 301 should be transcoded, e.g., with the discrete summary transcoder 441, the continuous conversion transcoder, 442, or some other transcoder 443. The network-content manager also dynamically adapts to a target rate for the transcoder and considers resource constraining characteristics of the network and user device. These two very important items are decided by the control 431.

Figure 5:
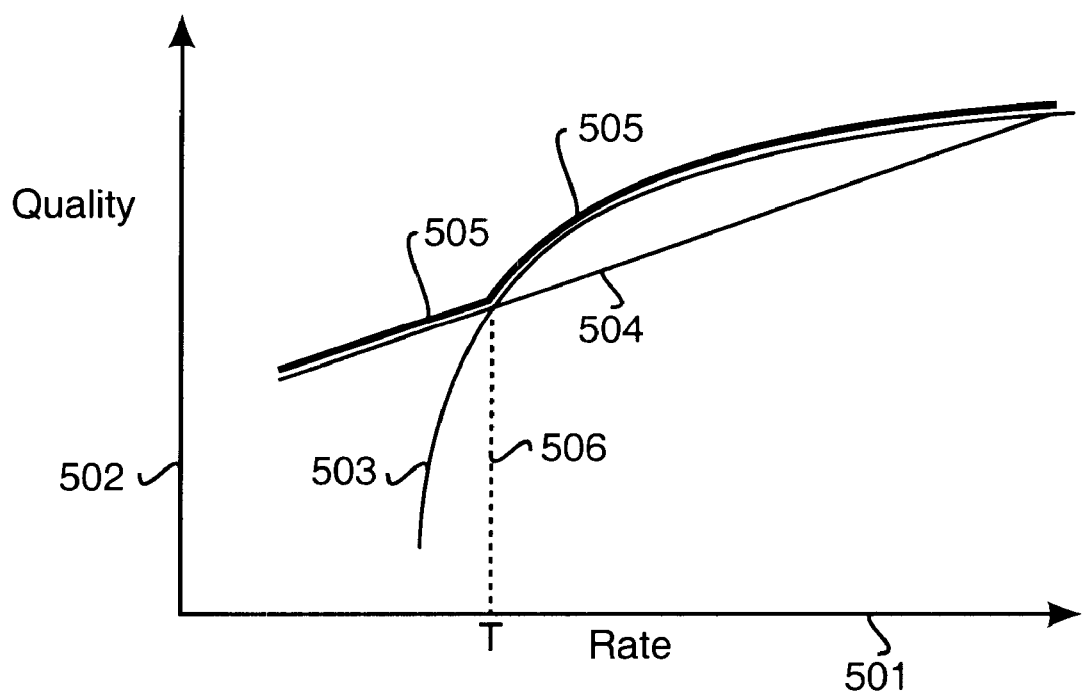
FIG. 5 is a graph of transcoding functions that can be used by the transcoder and manager of FIG. 4.

To better understand how the control makes optimal selection decisions, FIG. 5 graphs a plurality of rate-quality functions with respect to rate 501 and quality 502 scales. One rate-quality function of the continuous-conversion transcoder 442 is shown by a convex function 503. The rate-quality curve for the discrete-summary transcoder 441 is represented by a linear function 504. Other transcoders can have different functions.

It should be noted that these curves are only drawn for illustrative purposes. The true forms of the functions for a particular transcoder can vary depending on the content, how the content has been classified and possibly the current state of the network and device constraining characteristics. Obviously, at low bit rates, the continuous-conversion transcoder degrades rapidly in quality, for the reasons stated above. The optimal quality function 505 is shown in bold. This function best models the optimal quality that can be achieved for a given bit rate and user device.

We note there is a crossover in transcoding technique at a rate $=T$ 506. For rates greater than T, it is best to use the continuous-conversion transcoder, and for rates less than T, it is best to use the discrete-summary transcoder. Of course, the crossover point will vary dynamically as content and network characteristics vary.

As mentioned above, continuous-conversion transcoders usually assume classic distortion metrics, such as PSNR. Because such measures do not apply to our discrete-summary transcoder, it makes more sense to map the classic distortion metrics to a measure of "fidelity." Fidelity measures how well the content is semantically summarized, and not the quantitative bit-by-bit difference. Given the same quality metric, we avoid any inconsistency in deciding the optimal transcoding strategy.

Content-Network-Device Integrator

Referring back to FIG. 4, the CND integrator 432 is the part of the CND manager that combines together content information 302 from the content classifier 310 and network-device predictions 321 from the model predictor. It is this part of the manager that generates the model expressed as the rate-quality functions shown in FIG. 5, or other like optimization functions. To form the optimal operating model 321, the CND integrator, examines the mappings CI from the content classifier and bit rate feedback 351 that is output from the switchable transcoder 340. Using this information, the integrator chooses the optimal modeling function 505 that has certain model parameters. The rate feedback 351 is used to dynamically refine the parameters. If the integrator finds that the chosen model is not optimal, then the integrator can decide to dynamically switch rate-quality functions. Also, the integrator can track several functions for different objects or different bitstreams and consider the functions either separately or jointly.

Impact of Network Predictions

The network predictions 321 can affect these characteristic functions by modulating certain portions of the optimal curve 505 one way or another. For instance, when higher bit rates are available, one still needs to be most careful. The network model can allows us to expend a high number of bits at a particular time instant, but long-term effects tell us that congestion is likely to build quickly, therefore, our system can choose to hold back and continue to operate at a lower rate. Thus, we avoid problems related to a sudden drop in the available bit rate. These types of characteristics can be accounted for by modulating the curves of our transcoder.

Impact of Device Constraints

Device characteristics need also to be consider. Mobile devices have different operating characteristics than stationary devices, for example Doppler spread can degrade performance at higher available bit rates. Thus, a lower bit rate should be selected. The device can have limited processing, storage and display capabilities that can impact the transcoder. For example, there is no point in delivering a video to an audio only device. In fact, the switchable transcoder can include another transcoder 443 that converts speech to text, or data to speech, etc. The important point is that the present switchable transcoder takes the semantics of the bitstream content and the destination device into consideration, most prior art transcoders just consider the available bit rate.

Frame-Based Transcoder

The details of frame-based trancoding number of transcoders are known in the prior art. For example, see any of the following U.S. Pat. No. 5,991,716—Transcoder with prevention of tandem coding of speech; U.S. Pat. No. 5,940,130—Video transcoder with by-pass transfer of extracted motion compensation data; U.S. Pat. No. 5,768,278—N: 1 Transcoder;—U.S. Pat. No. 5,764,298 Digital data transcoder with relaxed internal decoder/coder interface frame jitter requirements;—U.S. Pat. No. 5,526,397—Switching transcoder; U.S. Pat. No. 5,334,977—ADPCM transcoder wherein different bit numbers are used in code conversion, or other like patents. None of these describe our technique for selecting a particular transcoding strategy depending on the semantic content of the bitstream and network characteristics. Below, we will also describe an object-based bitstream transcoder that can be selected The emphasis of this embodiment is to enable the dynamic selection of a transcoding strategy that gives the best delivery of the semantic content of the bitstream, and not how the actual transcoding is performed.

So far we have described the different types of trade-offs that can be made by a switchable transcoder including a continuous-conversion transcoder and a discrete-summary transcoder. In each of these transcoders, an optimal rate-quality curve is assumed.

Object-Based Transcoding

We now describe details how the rate-quality curve for continuous-conversion transcoders is derived and how suitable encoding parameters such as the QP and the amount of frame skip are determined. We also extend this work to the context of MPEG-4. We describing a framework that adaptively transcodes or scales objects in the video, or scene, based on available bit rate and complexity of each vide object.

Our scheme is adaptive in that various techniques can be employed to reduce the rate depending on the ratio of incoming to outgoing rate. Because our goal is to provide the best overall quality for objects of varying complexity, the degradation of each object need not the same. Note, here we parse objects, and not frames as described above.

The novelty of our system is that it is capable of transcoding multiple objects of varying complexity and size, but more important, our system is capable of making spatio-temporal trade-offs to optimize the overall quality of the video. We focus on object-based bitstreams due to the added flexibility. We also describe various means that are available to manipulate the quality of a particular object.

The main point worth noting is that the objects themselves need not be transcoded with equal quality. For example, the texture data of one object can be reduced, keeping intact its shape information, while the shape information of another object is reduced, keeping its texture information intact. Many other combinations can also be considered, including dropping frames. In a news clip, for example, it is possible to reduce the frame rate along with the texture and shape bits for the background, while keeping the information associated with the foreground news reader intact.

Quality of a Bitstream for Object-Based Transcoding

As stated above, conventional frame-based transcoders can reduce the bit rate sufficiently. However, the quality of the content can be severely degraded and the information that is conveyed in the reduced bit rate bitstream can be lost altogether. Conventionally, bitstream "quality" is measured as the bit-by-bit differences between the input and output bitstreams.

However, in object-based transcoding according to the invention, we are no longer constrained to manipulate the entire video. We transcode a bitstream that has been decomposed into meaningful video objects. We realize that the delivery of each object, along with the quality of each object, has a different overall impact on quality. Because our object-based scheme has this finer level of access, it becomes possible to reduce the level of spatio-temporal quality of one object without significantly impacting the quality of the entire stream. This is an entirely different strategy than used by conventional frame-based transcoders.

In contrast to conventional bitstream quality, which measures the bit-by-bit differences of the entire video without regard to content, we introduce the notion of "perceptual video quality." Perceptual video quality is related to the quality of objects in the video that convey the intended information. For instance, the background of a video can be completely lost without effecting the perceptual video quality of a more important foreground object.

Object-Based Transcoding Framework

Figure 6:
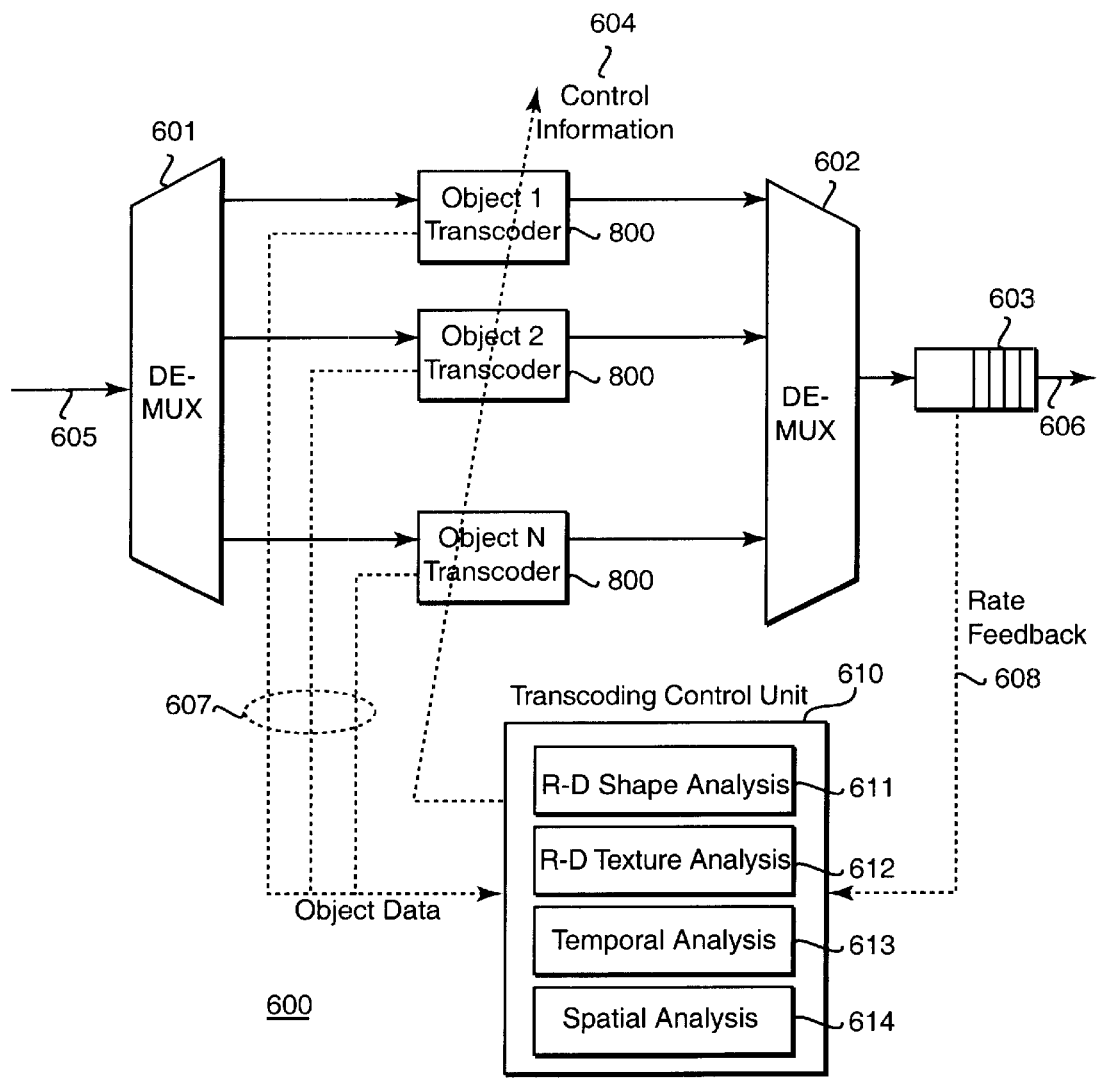
FIG. 6 is a block diagram of object-based bitstream scaling.

FIG. 6 shows a high-level block diagram of an object-based transcoder 600 according to an alternative embodiment of the invention. The transcoder 600 includes a demultiplexer 601, a multiplexer 602, and an output buffer 603. The transcoder 600 also includes one or more object-based transcoders 800 operated by a transcoding control unit (TCU) 610 according to control information 604. The unit 610 includes shape, texture, temporal, and spatial analyzers 611–614.

An input compressed bitstream 605 to the transcoder 600 includes one or more an object-based elementary bitstreams. The object-based bitstreams can be serial or parallel. The total bit rate of the bitstream 605 is $R_{in}$. The output compressed bitstream 606 from the transcoder 600 has a total bit rate $R_{out}$ such that $R_{out} < R_{in}$.

The multiplexer 601 provides one or more elementary bitstream to each of the object-based transcoders 800, and the object-based transcoders 800 provide object data 607 to the TCU 610. The transcoders 800 scale the elementary bitstreams. The scaled bitstreams are composed by the multiplexer 602 before being passed on to the output buffer 603, and from there to a receiver. The buffer 606 also provides rate-feedback information 608 to the TCU.

As stated above, the control information 604 that is passed to each of the transcoders 800 is provided by the TCU. As indicated in FIG. 6, the TCU is responsible for the analysis of texture and shape data, as well as temporal and spatial resolution. All of these new degrees of freedom make the object-based transcoding framework very unique and desirable for network applications. As with the MPEG-2 and H.263 coding standards, MPEG-4 exploits the spatio-temporal redundancy of video using motion compensation and DCT. As a result, the core of our object-based transcoders 800 is an adaptation of MPEG-2 transcoders that have been described above. The major difference is that shape information is now contained within the bitstream, and with regard to texture coding, tools are provided to predict DC and AC for Intra blocks.

It is also important to note that the transcoding of texture is indeed dependent on the shape data. In other words, the shape data cannot simply be parsed out and ignored; the syntax of a compliant bitstream depends on the decoded shape data.

Obviously, our object-based input and output bitstreams 601–602 are entirely different than traditional frame-based video programs. Also, MPEG-2 does not permit dynamic frame skipping. There, the GOP structure and reference frames are usually fixed.

Texture Models

The use of texture models for rate control in an encoder has been extensively described in the prior art, see for example, "MPEG-4 rate control for multiple video objects," IEEE Trans on Circuits and Systems for Video Technology, February 1999, by Vetro et al, and references therein.

In a texture model as used in our object-based transcoders 800, a variable R represents the texture bits spent for a video object (VO), a variable Q denote the quantization parameter QP, variables $(X_1, X_2)$ the first and second-order model parameters, and a variable S the encoding complexity, such as the mean absolute difference. The relation between R and Q is given by:

$$R = S \cdot \left( \frac{X_1}{Q} + \frac{X_2}{Q^2} \right)$$

Given the target amount of bits that are assigned to a VO, and the current value of S, the value of Q depends on the current value of $(X_1, X_2)$. After a VO has been encoded, the actual number of bits that are spent is known, and the model parameters can be updated. This can be done by linear regression using results of previous n frames.

Texture Analysis

The transcoding problem is different in that Q, the set of original QP's, and the actual number of bits are already given. Also, rather than computing the encoding complexity S from the spatial domain, we must define a new DCT-based complexity measure, $\tilde{S}$. This measure is defined as:

$$\tilde{S} = \frac{1}{M_C} \sum_{m \in M} \sum_{i=1}^{63} \rho(i) \cdot |B_m(i)|^2$$

where $B_m(i)$ are the AC coefficients of a block, m is a macroblock index in the set M of coded blocks, $M_C$ is the number of blocks in that set, and $\mu(i)$ is a frequency dependent weighting. The complexity measure indicates the energy of the AC coefficients, where the contribution of high frequency components is lessened by the weighting function. This weighting function can be chosen to mimic that of an MPEG quantization matrix.

From the data transmitted in the bitstream, and the data from past video objects, the model parameters can be determined, and continually updated. Actually, we can update the model twice for every transcoded VOP; once before transcoding using data in the bitstream, then again after coding the texture with the new set of QP's, Q'. With this increased number of data points, the model parameters are more robust and converge faster.

The main objective of our texture analysis is choosing Q' which satisfy the rate constraint while minimizing distortion. However, it is important to note that optimality is conditioned on Q. Therefore, we must take care in how the distortion is quantified. From this point on, we will refer to this distortion as a conditional distortion due to the dependence on Q.

One way to determine Q' is to utilize the same methodology as used in the rate control problem. This way, we first estimate a budget for all VOP's at a particular time instant, adjust the target to account for the current level of the buffer, then distribute this sum of bits to each object. Given these object-based target bit rates, the new set of QP's can be determined from our texture model. The main problem with this approach is that we rely on the distribution of bits to be robust. In general, the distribution is not robust and the ability to control our conditional distortion is lost because the new QP's have been computed independent of the original ones.

Conditional Distortion

To overcome this problem, and to attempt to solve for Q' in some way that is dependent on Q, we describe a method based on a dynamic programming. To maintain as close a quality as possible to the original quality, the QP's of each object should change as little as possible. Given this, we can define a conditional distortion as:

$$D(Q' \mid Q) = \sum_{k \in K} \alpha_k [D(Q'_k) - D(Q_k)]$$

where k denotes a VOP index in the set of VOPs, K, and $\alpha_k$ represents the visual significance or priority of object k. Note, although D(Q) is not explicitly specified, we know that it is proportional to Q. The visual significance can be a function of the objects relative size and complexity.

QP Search Space

Figure 7:
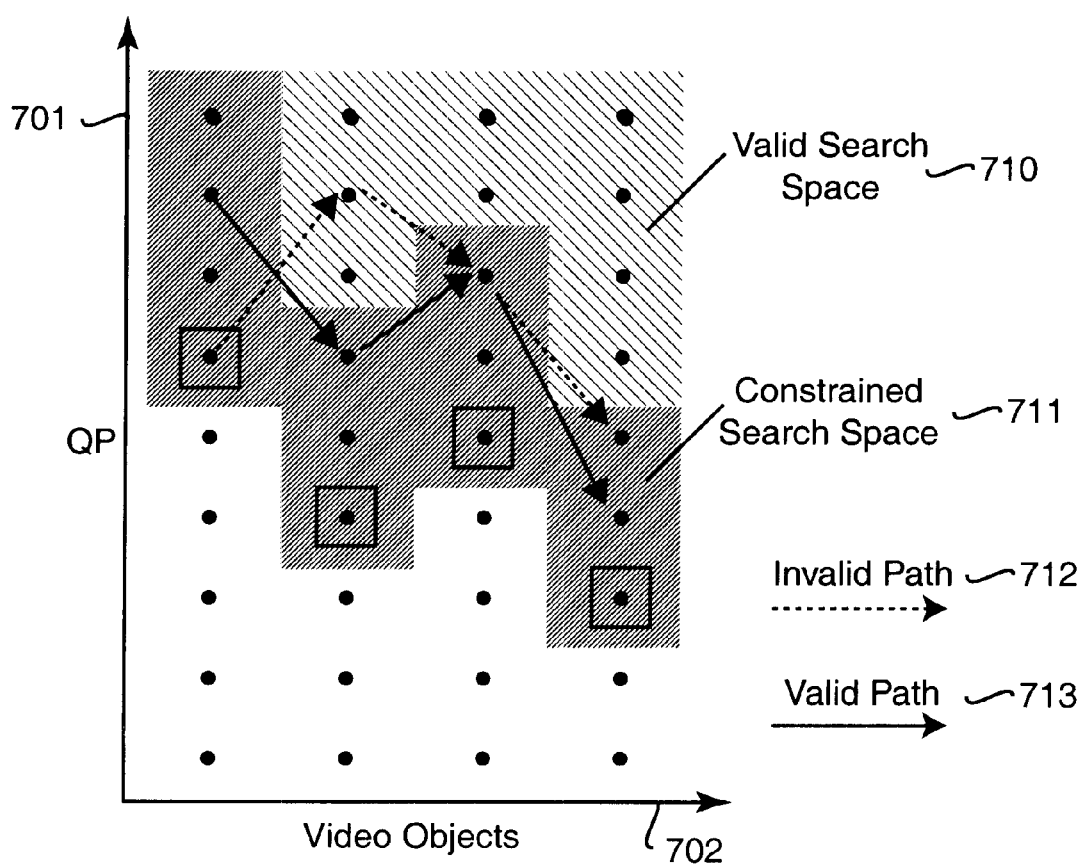
FIG. 7 is a graph of a search space.

It is important to note that $Q_k > Q_k$, for all k>Therefore, the solution space is limited to a valid solution space shown in FIG. 7. In FIG. 7, the x-axis indicates video objects, 701, and the y-axis QP. The Figure also shows a valid search space 710, a constrained search space 711, a valid path 712, and an invalid path 713.

Given the above quantification for conditional distortion, we solve our problem by searching for the best path through the trellis of FIG. 7, where the valid QP's are nodes in the trellis, and each node is associated with an estimated rate and conditional distortion. Formally, the problem can be stated as:

$$\min D(Q'|Q) \text{ subject to } R_{TOTAL} < R_{BUDGET}$$

Converting the constrained problem into an unconstrained problem solves this problem, where the rate and distortion are merged through a Lagrangian multiplier, $\lambda$. For any $\lambda > 0$, the optimal solution can always be found. To determine the value of $\lambda$ that satisfies the constraint on the rate, the well-known bisection algorithm can be used, see Ramchandran and Vetterli, "Best wavelet packet bases in the rate-distortion sense," IEEE Trans. Image Processing, April 1993.

It is important to emphasize that the search space considered is much less than found in MPEG-2 transcoding algorithms. There, an attempt is made to find the best set of quantizers for every macroblock. In contrast here, we only search for object-based quantizers. Hence, our approach is very practical.

Temporal Analysis

Generally speaking, the purpose of skipping frames is to reduce the buffer occupancy level so that buffer overflow, and ultimately the loss of packets, is prevented. Another reason to skip frames is to allow a trade-off between the spatial and temporal quality. In this way, fewer frames are coded, but they are coded with higher quality. Consequently, if the buffer is not in danger of overflowing, then the decision to skip a frame is incorporated into the QP selection process.

Building from the proposed technique for QP selection, which searches a valid solution space for a set of QP's, we achieve this spatial—temporal trade-off by constraining the solution space. As shown in FIG. 7, a valid path is one in which all elements of Q fall in the constrained area. If one of these elements falls outside the area, then the path is invalid in that it is not maintaining some specified level of spatial quality. The spatial quality is implied by the conditional distortion.

Different criteria can be used to determine the maximum QP for a particular object. For example, the maximum value can be a function of the object complexity or simply a percentage of the incoming QP. In the case where the maximum is based on complexity, the transcoder essentially limits those objects with higher complexity to smaller QPs, because their impact on spatial quality is most severe. On the other hand, limiting the complexity based on the incoming QP implies that the transcoder maintains a similar QP distribution as compared to the originally encoded bitstream. Both approaches are valid. Trade-offs to determine the best way to limit the QP for each object can depend on trade-offs between spatial and temporal quality.

Of course, one of the advantages in dealing with object-based data are that the temporal quality of one object can be different from another. In this way, skipping the background object, e.g., stationary walls, for example can save bits. However, because objects are often disjoint, reducing the temporal resolution of one object can cause holes in the composed video. Imposing the constraint that all VOP's have the same temporal resolution can reduce this problem.

Shape Analysis

To introduce the problems with transcoding shape data of video objects, we recall how texture information is transcoded. It is well known that the rate for texture can be reduced by a partial decoding of the data. In most cases, this partial decoding requires at least the variable-length decoding (VLD) operation to be performed. The inverse quantization and inverse DCT can be omitted.

However, for shape data, this is not the case. In MPEG-4, the shape data are coded on a per block basis by the so-called context-based arithmetic encoding algorithm, see Brady, "MPEG-4 standardization methods for the compression of arbitrarily shaped objects," IEEE Trans Circuits and Systems for Video Technology, December 1999. With this algorithm, a context for each pixel is computed based on either a 9-bit or 10-bit causal template, depending on the chosen mode. This context is used to access a probability look-up table, such that the sequence of probabilities within a block drives an arithmetic encoder.

In contrast to the texture, partial decoding of the shape is not possible because there is no intermediate representation between the pixel domain and the bitstream. Therefore, in order to manipulate the resolution of the shape data, the data must be fully decoded. After decoding, models such as described in U.S. patent application Ser. No. 09/410,552 "Estimating Rate-Distortion Characteristics of Binary Shape Data," filed Oct. 1, 1999 by Vetro et al, can be used to evaluate the rate-distortion characteristics of the shape.

Spatial Analysis

Another means of reducing the rate is to reduce the resolution by sub-sampling. In version 2 of the MPEG-4 standard, a tool called Dynamic Resolution Conversion (DRC) has been adopted into the MPEG-4 standard. With this tool it is be possible to reduce the resolution, i.e., spatial quality, of one object, while maintaining the resolution of other more important or spatially active objects.

Architecture

Figure 8:
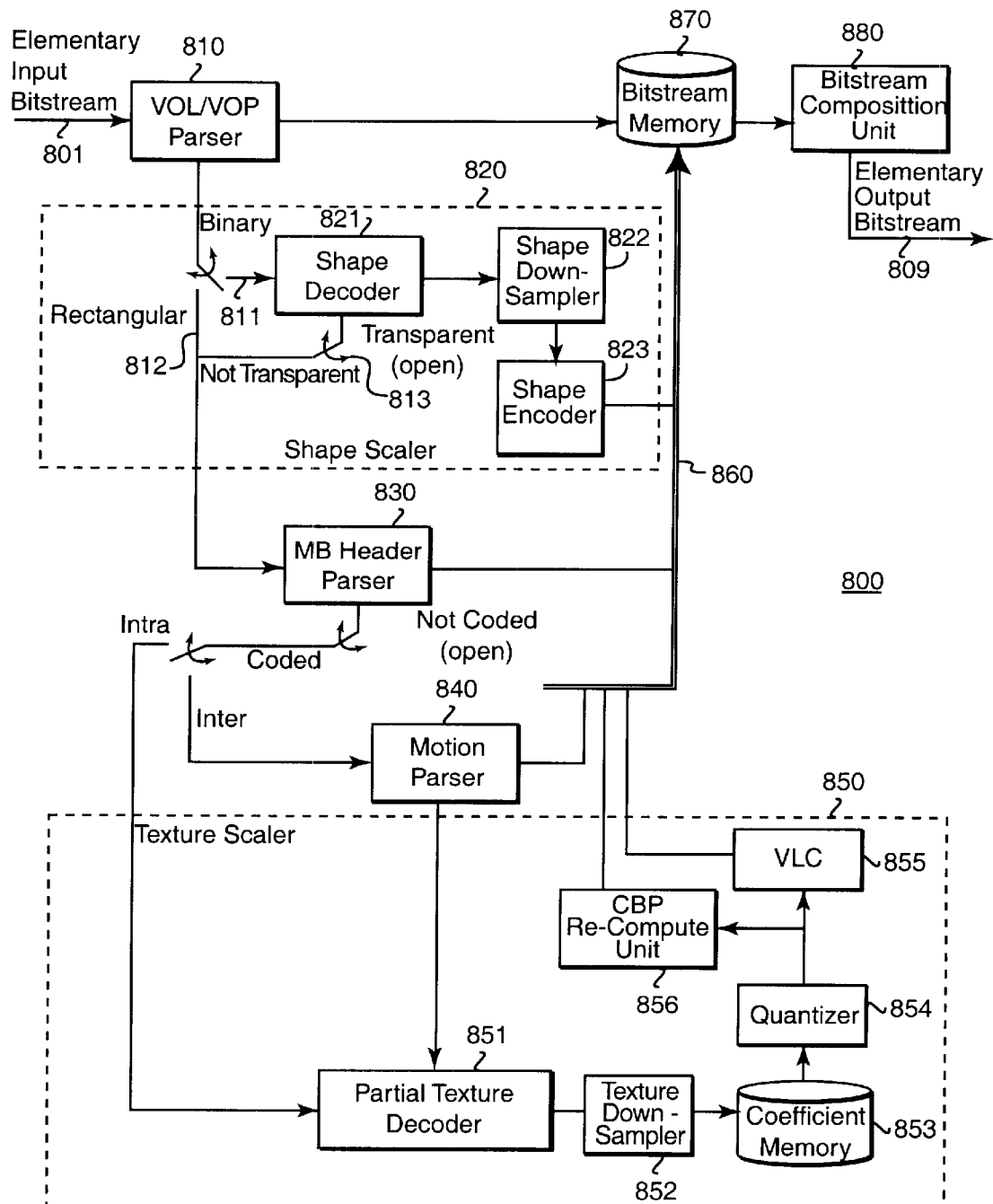
FIG. 8 is a block diagram of details of an object-based transcoder according to the invention.

FIG. 8 shows the components of an object-based transcoder 800 according to our invention. As with transcoding architectures in the prior art, the syntax of encoding standards somewhat dictates the architecture of the transcoder 800. We will now describe the major features of our transcoder in light of the MPEG-4 standard and contrast these features with traditional frame-based transcoding.

The transcoder 800 includes a VOL/VOP parser 810, a shape scaler 820, a MB header parser 830, a motion parser 840, and a texture scaler 850. The transcoder also includes a bus 860 that transfers various parts of the elementary bitstream 801 to a bitstream memory 870. From this global storage, the elementary bitstreams composition unit 880 can form a reduced rate compressed bitstream, compliant with the MPEG-4 standard. The output elementary bitstream 809 is fed to the multiplexer of FIG. 6.

In MPEG-4, the elementary bitstreams for each object are independent of other bitstreams. As a result, each object is associated with a video object layer (VOL) and video object plane (VOP) header. The VOP header contains the quantization parameter (QP) that was used to encode the object. The QP for each object is later used in the modeling and analysis of the texture information. All other bits are stored in the bitstream memory 870 until it is time to compose the outgoing bitstream 606 of FIG. 6.

The most significant difference from other standards is that MPEG-4 is capable of coding the shape of an object. From the VOL layer, we find out whether the VOP contains shape information (binary) or not (rectangular) 812. If it is a rectangular VOP, then the object is simply a rectangular frame and there is no need to parse shape bits. In the case of binary shape, we need to determine 813 if the macroblock is transparent or not. Transparent blocks are within the bounding box of the object, but are outside the object boundary, so there is no motion or texture information associated with it.

The shape scaler 820 is comprised of three subcomponents: a shape decoder/parser 821, a shape downsampler 822, and a shape encoder 823. If the shape information of the bitstream is not being scaled, then the shape decoder/parser is simply a shape parser. This is indicated by the control information 604 received from the R-D shape analysis 611 of the transcoder control unit 610. Also, in this case, the shape down-sampler 822 and shape encoder 823 are disabled. When shape information is being scaled, the shape decoder/parser 821 must first decode the shape information to its pixel domain representation. To reduce the rate for shape, a block can be down-sampled by a factor of two or four using the shape down-sampler 822, then re-encoded using shape encoder 823. The ratio of conversion is determined by the R-D shape analysis 611. Whether the shape bits have simply been parsed or scaled, the output of the shape scaler 820 is transferred to the bitstream memory 870 via the bitstream bus 860.

Other than the shape bits, the remainder of the MPEG-4 syntax is somewhat similar to that of MPEG-2 with a few exceptions. At the macroblock (MB) layer, there exist bits that contain the coded block pattern (CBP). The CBP is used to signal the decoder which blocks of a macroblock contain at least one AC coefficient. Not only does the CBP affect the structure of the bitstream, but the CBP also has an impact on Intra AC/DC prediction. The reason that the transcoder must be concerned with this parameter is because the CBP will change according to the re-quantization of DCT blocks. For this reason, we re-compute the CBP after the blocks have been re-quantized; a CBP re-compute unit 856 of the texture scaler accomplishes this. The unit 856 sends a variable length code (VLC) 855 to the bitstream memory 870 via the bitstream bus 860 to replace the header that was present in the input bitstream.

After we have parsed the elementary bitstream to extract the relevant decoding parameters, we proceed to partially decode the texture blocks 851. The result of this process are the DCT block coefficients. If the spatial (re-size) analysis is enabled, the object can be down-sampled by a factor of two or four. The ability to down-sample blocks is indicated by the transcoding control unit 610, and the down-sampling factor by the spatial analysis 614. Furthermore, this down-sampling is performed in the DCT domain so that the IDCT/DCT operations can be avoided, see U.S. Pat. No. 5,855,151, "Method and apparatus for down-converting a digital signal," issued on Nov. 10, 1998 to Bao et al. The DCT blocks are then stored temporarily in a coefficient memory 853. From this memory, blocks are sent to quantizer 854, which quantizes the blocks according to the QP sent from the R-D texture analysis 612, which uses the techniques described in this invention to meet the new target rate.

To skip objects, the temporal analysis 613 indicates to the bitstream composition 880 unit which bits are to be composed and sent out, and which bits should be dropped. In this way, parts of the bitstream that can have been written into this memory will simply be overwritten by data of a next video object.

Implementation & Processing

Regarding a specific embodiment, it should be noted that the architecture of transcoder 800 illustrates the components for a single object. In the extreme case, multiple objects can scaled with multiple transcoders as shown in FIG. 6. In a software implementation that considers multi-thread execution, this can be the most efficient way. The challenge in a software implementation is to allocated appropriate amounts of CPU processing to each object under consideration.

However, for hardware implementations, the case is very different. Hardware designers usually prefer to have one piece of logic that handles a specific functionality. For example, rather than implementing M motion parsers for a maximum number of M objects that can be received, the hardware design includes a single motion parser that operates at a certain speed so that multiple objects can be parsed at a given time instant. Of course, if the number of objects exceeds the parser's throughput, then parallel parsers can still be used. The main point is that the number of parsers required can be less than the than the total objects that are received, and computation is distributed among the parallel parsers. This notion applies to all sub-blocks of the transcoder 800.

Hierarchical Cue Levels

Figure 9:
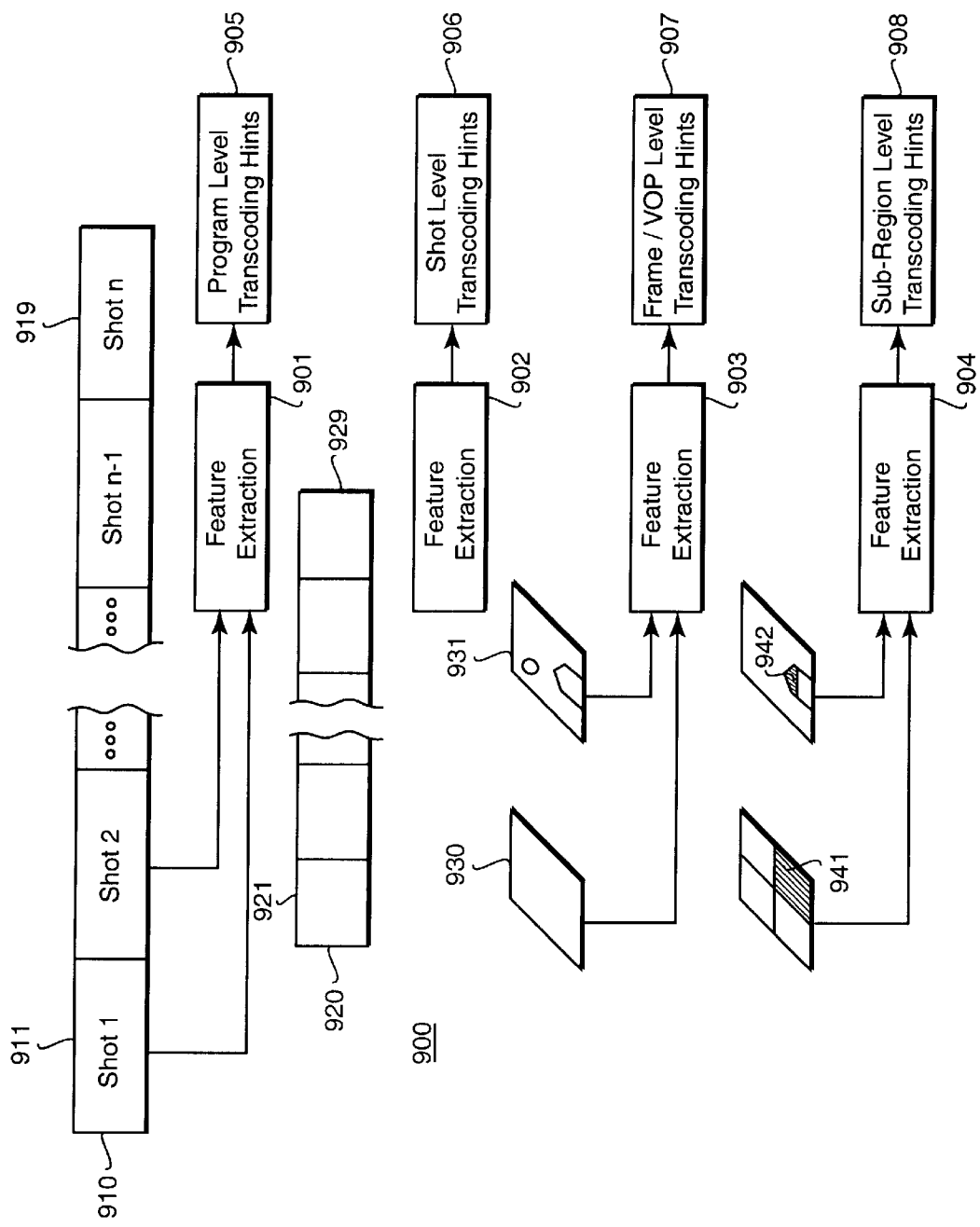
FIG. 9 is a block diagram of feature extraction according to cue levels.

We now describe a system where the transcoding is according to features extracted from various levels of a video. In general, a video can be partitioned into a course-to-fine hierarchy 900 as shown in FIG. 9. A video program or session 910 is considered to be the highest level of the hierarchy 900. This level can represent a 30-minute news program or an entire day of programming from a broadcast network. The program 910 includes a sequence of shots Shot-1, . . . , Shot-n 911–919.

The next level 920 is partitioned into shots. A "shot" can be a group of frames (GOF's), or a group of video object planes (GOV's) 921–929. This level represents smaller segments of video that begin when a camera is turned and last until the camera is turned off. To avoid any confusion, we will simply refer to this level as the shot-level 920.

Shots are composed of the most basic units, for GOF's, frames 930, and for GOV's or video object planes (VOP's) 931. We can also consider another level below this, which refer to sub-regions 941–942 of the frame or VOP.

At each level in the video program hierarchy 900, we apply feature extraction processes 901–904 to the video data at each of the levels. Of course, because the data at each level are arranged in a different manner and the relevant features change from level to level, different feature extraction techniques are applied to each level. That is, program level feature are extracted in a different manner than frame features.

In the context of our transcoder, these features represent "hints" or "cues" 905–908 that can be applied to the transcoding system. These hints can be either semantic or syntactic, and can represent either high-level or low-level meta-data.

It should be understood that meta-data can be applied to transcoding at any given level. In general, meta-data for the higher level data, such as shot-level, are used for classification, bit allocation and rate-quality considerations for that particular shot and among other shots. For this case, the meta-data are of limited use to the transcoder, but very useful to the CND manager 330 of FIG. 3 that decides the transcoding strategy among all outgoing content. In contrast, meta-data for lower-level data, such as object-level, can be more useful to the transcoder 340 itself to help with dynamic bit-allocation because it is difficult to classify and manage outgoing content at such a low-level.

In the following, we describe how low-level features can be clustered (classified) and mapped into meaningful parameters that are related to the rate-quality trade-off. In describing these clustering methods, we mainly focus on higher-level classifications of the content, but low-level classifications can also be included. Next, a hybrid discrete-summary and continuous-conversion transcoder is described. Again, the techniques are described with a major focus on using high-level (shot-level) meta-data in the CND manager. However, we can also consider such meta-data in the discrete-summary transcoder. Finally, we describe how to guide the transcoding using meta-data. As described, this is equally applicable to both the managing and transcoding stages.

Content Classifier: Stage III

As stated earlier for FIG. 3, the main function of the content classifier 310 is to map features of content characteristics, such as activity, video change information and texture, into a set of parameters that we use to make rate-quality trade-offs. To assist with this mapping function, the content classifier also accepts meta-data information 303. Examples of meta-data include descriptors and description schemes (DS) that are specified by the emerging MPEG-7 standard.

Figure 10:
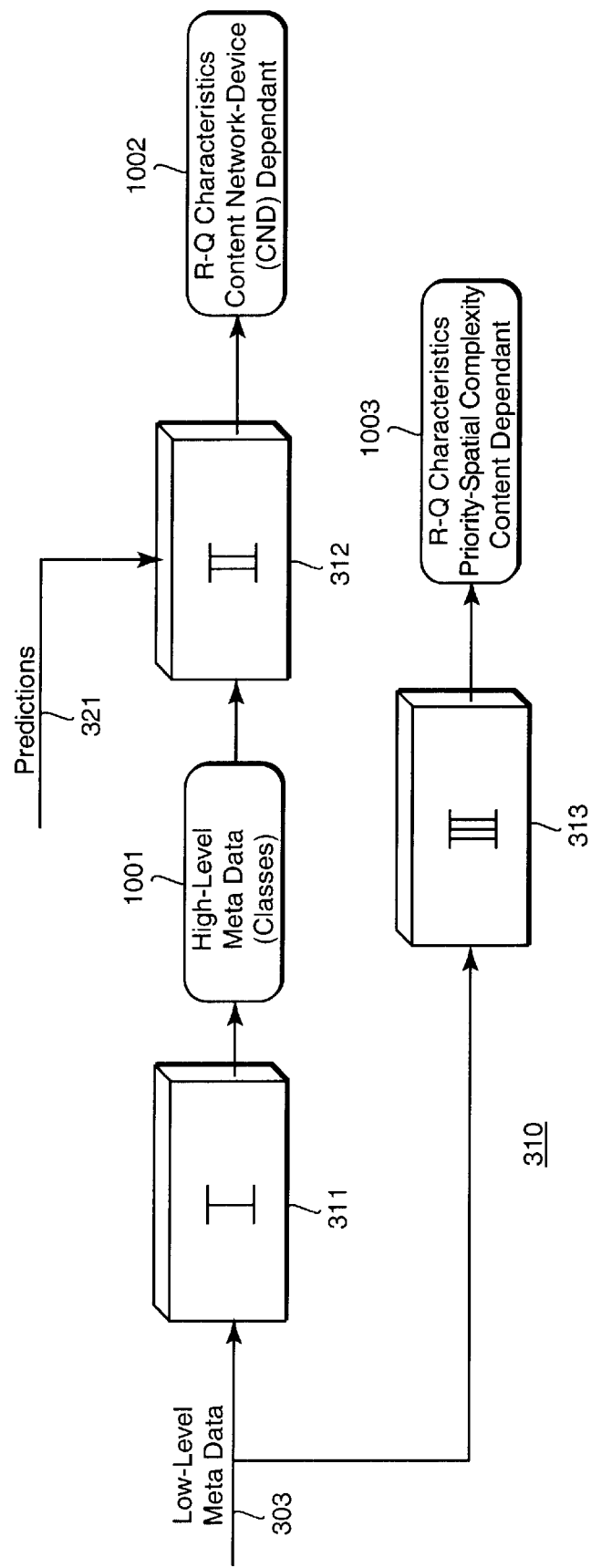
FIG. 10 is a block diagram of a video content classifier with three stages.

In stage III 313 of the content classifier 310, such low-level meta-data are mapped to rate-quality characteristics that are dependent on the content only. This is illustrated in FIG. 10. The rate-quality characteristics in turn affect the rate-quality functions shown in FIG. 5.

The content classifier 310 receives low-level meta-data 303. Stage I 311 extracts high-level meta-data or classes 1001. Stage II 312 uses the predictions 321 to determine rate-quality (R-Q) characteristics that are content, network, and device dependent. Stage III 313 extracts R-Q characteristics 1003 that are only dependent on low-level meta-data.

As an example, we describe how the spatial distribution parameters of the motion activity descriptor in MPEG-7 enable classification of the video segments of a program into categories of similar motion activity and spatial distribution.

Consider a news program. The news program includes several shots of an anchorperson and a variety of other shots that further relate to the overall news story.

The examples shown in FIGS. 11*a*–*b* and 12*a*–*b* consider a news program 1200 with three shots 1201–1203, an anchor person shot, a reporter on scene shot, and a police chase shot. For simplicity of the example, we classify all news program shots into only three categories, with the understanding, that in a real application, the number of categories different in number and kind.

A first class 1101 represents shots where the temporal quality of the content is less important than the spatial quality. A second class 1102 represents shots where the spatial quality of the content is more important, and a third class 1103 where the spatial and temporal qualities of the shot are equally important.

This set of classes will be referred to as SET-1110. Such classes are clearly characteristics of rate and quality. The objective of stage III 313 of the content classifier is to process low-level features and map these features into the most suitable of these classes. It should be noted that the importance of the spatial and temporal quality can also be rated on a scale of one to ten, or on a real number interval 0.0 to 1.0.

To illustrate these rate-quality classes further, consider another set of three distinct classes as shown in FIG. 11*b*. A first class 1121 indicates that the shot is very simple to compress, i.e., large compression ratios can easily be achieved for a given distortion. A third class 1123 represents the complete opposite, i.e., the content of the shot is very difficult to compress, either due to large/complex motion or a spatially active scene. A second class 1122 is somewhere in between the first and third classes. This set of classes will be referred to as SET-2 1120. As with the other set of classes 1110, these classes 1120 also illustrate the effects that content classification can have on the rate-quality decisions made by the CND manager 330 and how the switchable transcoder 340 can operate. As above, the compression difficulty can be classified on a numeric scale. It should be understood that other sets of classes can be defined for other types of video programs.

So far, we have described two examples of rate-quality classes, SET-1 and SET-2. Content is classified into these classes according to the features that are extracted from the low-level meta-data 303. In the following, we describe how these classes can be derived from motion activity.

For most news program, it is expected that the analysis of all anchorperson shots will yield similar motion activity parameters, which infer relatively low motion. Given this data, and assuming SET-1 1110, we can classify such content into the second class 1102 (importance of spatial quality>temporal quality). Furthermore, we can expect that all police chases, and shots of the like, be classified into the first class 1101 (importance of temporal quality>spatial quality). Finally, depending on the background activity of the reporter on the scene, this type of shot can be classified in any one of the three available classes. For the purpose of the example, this shot is classified into the third class.

FIG. 12(*a*) illustrates a transcoding strategy according to the classification of SET-1. The anchorperson shot 1201 is transcoded using a discrete summary transcoder 1210, see block 441 of FIG. 4. This transcoder reduces the entire shot 1201 to a single frame 1211, i.e., a still picture of the anchorperson. For the duration of the shot, the entire audio portion of the anchorperson talking is provided.

The reporter on the scene shot 1202 is continuously converted at five frames per second 1221 with full audio to preserve some sense of motion in the background to the viewer.

The police chase shot 1203 is also continuously converted 1230 at thirty frames per second 1231.

In any case, whether the content classifier is given access to meta-data that described the content, or the classifier derives the data directly from the content itself, the utility of this information can directly be understood in view of the rate-quality trade-offs that the CND manager must ultimately make.

Figure 12A:
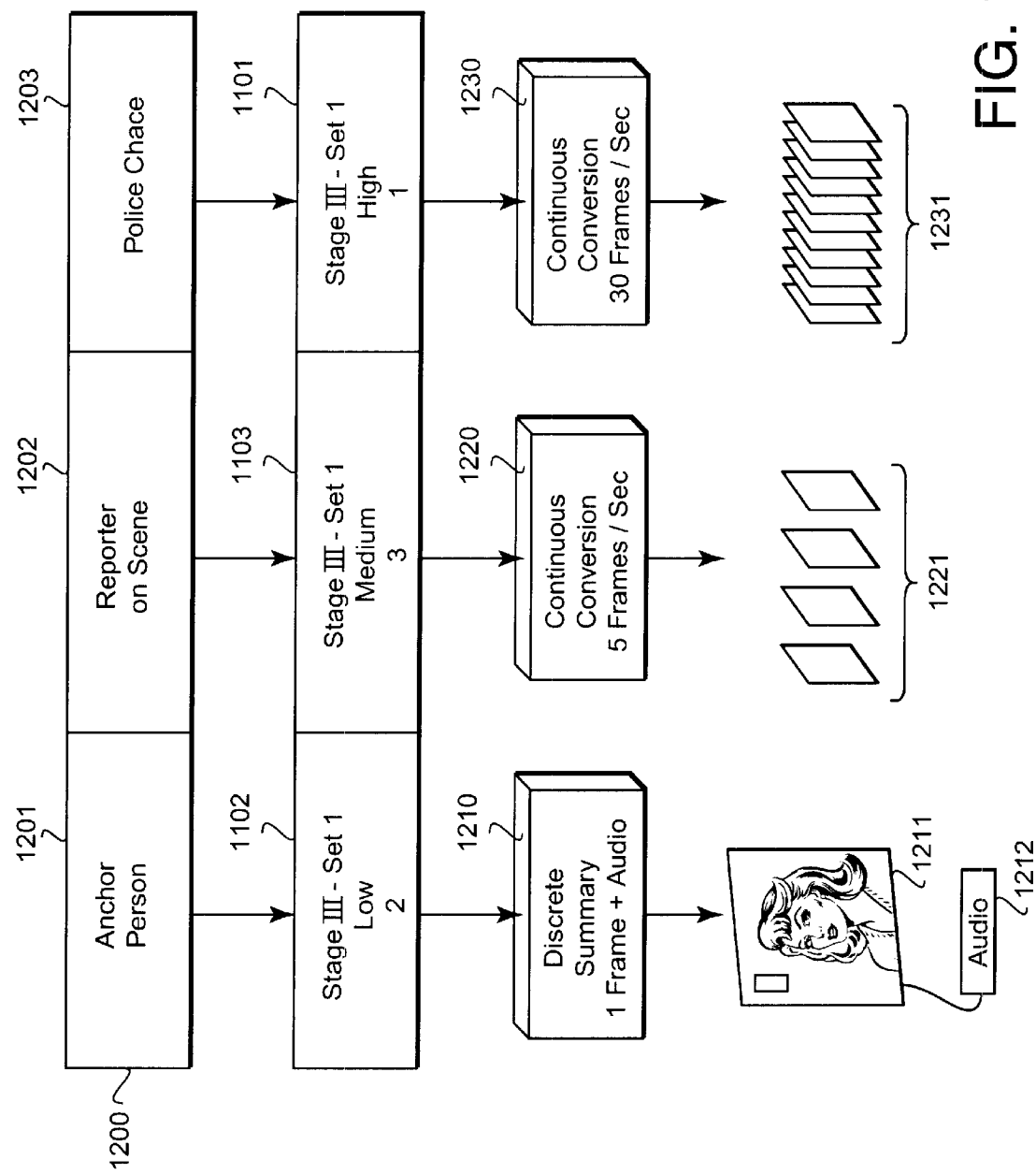
Figure 12B:
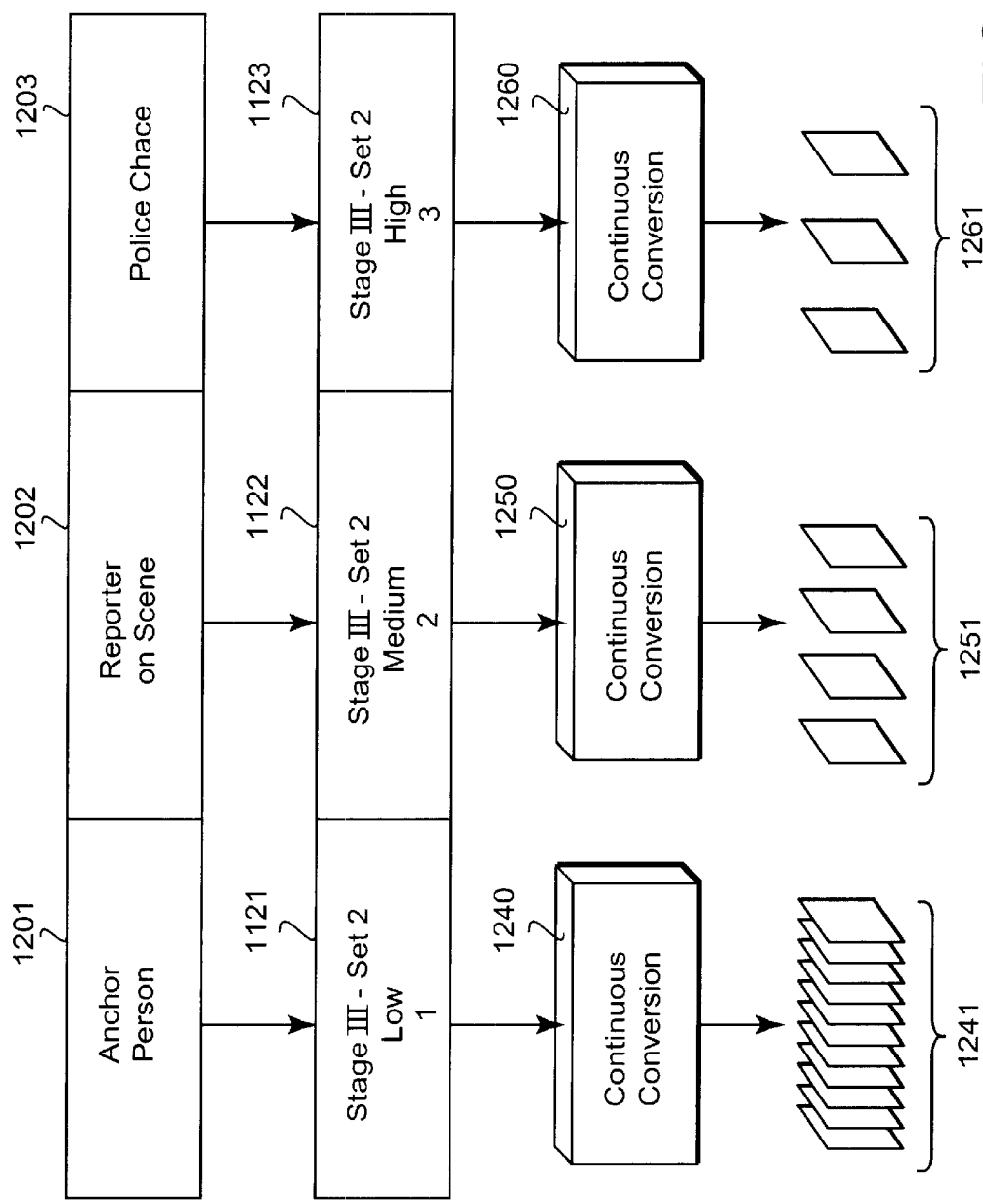
FIG. 12b is a block diagram of transcoding according to the descriptor schemes of FIG. 11b.

In contrast with the above example, if we assume the same program 1200 and SET-2 1120 classifications instead, then the classification results can be interpreted differently as shown in FIG. 12*b*. With SET-2, the lack of motion in the anchorperson shot 1201 makes the segment very easy to compress, hence it is classified into the first class 1121 of Set-2. This shot is continuously converted 1240 with high compression at thirty frames per second 1241. The police chase shot 1203, however, contains high motion and is more difficult to compress. Therefore, it is classified into the third class 1123 of Set-2. It is continuously converted 1260 at 7.5 frames per second 1261. Again, depending on the characteristics of the shot 1202 with the on-scene reporter, it can fall into any one of the three classes. For purpose of the example, it is assigned to the second class 1122, and continuously converted 1250 at 15 frames per second 1251.

It should be noted, that the hints can produce either a constant or variable rate bit stream (CBR or VBR). For example, if the classification is based on compression difficulty (SET 2), then a CBR bit stream can be produced when a low-frame rate is imposed on a difficult to compress sequence of frames, and a VBR bit stream when more bits are allocated.

In the following paragraphs, we describe how these different classifications can be used to generate a transcoding strategy.

Hybrid Continuous-Conversion and Discrete -Summary Transcoding

It should be emphasized that the rate-quality mapping implied by each class can vary widely depending on the specific application. In the above examples, we illustrated that the spatial and temporal quality can be affected by the difficulty to compress a video or the level of priority assigned to the spatial and temporal quality. Both classifications were derived from low-level features.

To the CND manager 330, these classifications suggest ways in which the content can be manipulated. In fact, classification can significantly reduce the number of scenarios to consider. For instance, if the CND manager has to consider the rate-quality trade-offs for multiple bit streams (frames or objects) at a given time instant, then the CND manager can consider the best way to distribute transcoding responsibility between continuous-conversion and discrete-summary transcoding. Rather than choosing one way for all segments under consideration, it is also possible to consider a hybrid scheme. Priorities of the program, or compression difficulties according to its low-level features, are examples of useful parameters that can be used to make such decision.

FIGS. 12(*a*) and (*b*) illustrate how the classifications in SET-1 1110 and SET-2 1120 affect the strategy determined by the CND manager and the way in which the transcoder manipulates the original data. Of particular interest in FIG. 12(*a*) is that a hybrid transcoding scheme is employed.

Going back to our example of the news program 1200, and considering SET-1 classifications, we can assign the anchorperson shot a lower priority than the police chases. If we are dealing with object-based video, then another way to transcode is to assign the background of shot 1201 a lower priority than the anchorperson in the foreground. This can all be accomplished through classification or classifications of object-level motion activity parameters, for example.

We have used the motion activity to illustrate these concepts. However, it should be understood that other low-level features or MPEG-7 descriptors such as shape parameters, texture information, etc., can also be used. Whether low-level features are considered individually or in combination, they can be used to effectively cluster and classify video content into meaningful parameters that assist the CND manager and the transcoders.

It may appear that the CND classifier 310 and CND manager 330 conflict with the TCU 610 of FIG. 6, but this is not the case. The classifier and CND manager attempt to pre-select the best strategy for the transcoder 340. Given this strategy and instruction from the manager, the transcoder is responsible to manipulate the content in the best way possible. In the event the transcoder cannot fulfill the request due to erroneous predictions, or a chosen strategy by the CND manager, the transcoder still needs mechanisms to cope with such situations, such as temporal analysis. Therefore, meta-data can also be used in the TCU. However, the purpose of the meta-data for the TCU is different than for the classifier and CND manager.

Effects of Meta-Data on Transcoding

There are two ways that meta-data can affect transcoding. Both are directly related to the bit allocation problem described above. The first way is in the CND manager 330 where the bit allocation is used to derive a strategy and ultimately a decision on how to use the functions provided by the Discrete-Summary and Continuous-Conversion Transcoders 441–442. In this way, the rate-quality functions of FIG. 5 are used for decision making. The second way is in the transcoder 340 itself. Again, the meta-data are used for estimation, but rather than making decisions on strategy, the meta-data are used to make real-time decisions on the coding parameters that can be used to meet the bit-rate objectives. In this way, the coding parameters are chosen so that the transcoders achieve the optimal rate-quality functions of FIG. 5.

In general, low-level and high-level meta-data provide hints to perform discrete-summary and continuous conversion transcoding. These hints are useful to both the CND manager and the transcoder. To illustrate, we first consider high-level semantic information associated with the content. The semantic information can automatically be associated with the content or by manual annotation.

Take the case where a database stores a number of video programs. The videos have been rated according to a variety of categories, e.g., level of "action." In an application where multiple users request various shots simultaneously, the CND manager 330 must decide how much rate is allocated to each shot. In the discrete-summary transcoder 441, this rate can correspond to the number of frames that are sent, whereas in the continuous-conversion transcoder 442, the rate can correspond to the target frame-rate that is acceptable. Given that the level of action indicates a certain level of temporal activity, bits can be allocated per frame sequence according to the description of the content. For shots with high action, the CND managers determines that a frame-rate less than a predetermined level is unacceptable for the continuous-conversion transcoder, and that a better quality shot can be deliver by summarizing the content with the discrete-summary transcoder.

Within the discrete-summary transcoder, we can also consider the number of frames that are acceptable to achieve a reasonable level of perceptual quality.

Going back to the low-level motion activity descriptor, it can be reasoned that video sequences having associated activity parameters that imply low motion, intensity can be summarized with fewer frames than those shots with activity parameters that imply high motion intensity. As an extension to this, it can easily be understood how such bit allocations can be applied at the object-level as well.

Generating High-Level Meta-Data from Low-Level Meta-Data

The process of generating high-level meta-data from low-level meta-data can be defined as meta-data encoding. Such an encoding process can be considered at Stage I 311 in the content classifier of out transcoding system.

Additionally, this high-level generation process can be used in a stand-alone system. An example of one such stand-alone system is a system that instantiates description schemes specified by the MPEG-7 standard. One can call such a system an MPEG-7 high-level meta-data encoder.

In the current MPEG-7 Working Draft, there are high-level description schemes that are placeholders for various types of meta-data. It should be noted that normative parts of the standard explicitly define requirements essential to an implementation; informative parts only suggest potential techniques or one way of doing something. In MPEG-2, determining suitable motion vectors or quantization parameters are considered an encoder issue, hence informative parts of the standard. The standard does specify variable-length coding (VLC) tables for the motion vector, and a 5-bit field for the quantization parameter. How these fields are used is strictly an encoder issue, and of no concern to the standard, hence informative.

In MPEG-7, the normative and informative fields of the various description schemes are in a similar situation. The fields have been specified, but how one generates data for these fields is informative. For transcoding and summarization, we consider various description schemes that have been specified in the MPEG-7 Working Draft, for example, the SummaryDS, the VariationDS, HierarchicalSummaryDS, HighlightSegmentDS, ClusterDS, and ClassifierDS, see, ISO/IEC JTC N3113, "MPEG-7 Multimedia Descriptor Schemes WD," December 1999, for additional descriptor schemes.

For example, the SummaryDS is used to specify a visual abstract of the content that is primarily used for content browsing and navigation, and the VariationDS is used to specify variations of the content. In general, the variations can be generated in a number of ways and reflect revisions and manipulations of the original data. However, such description schemes as the SummaryDS and the VariationDS do not describe how to summarize or generate variations of the content.

These description schemes simply include tags or fields of information that provide a system with information on the "properties" of the summarized content or variation data, "where" the content can be found, and "what" operations can have been performed on it, etc. This implies that all manipulations have been done prior to transmission. Where such fields do exist, the task of the CND manager is simplified because the manager is handed a list of available summaries or pre-transcoded data with associated properties.

Although there are advantages in having this information available, such as a simplified CND manager and transcoder, there are two major problems. The first major problem is that these variations must be generated prior to any request for the original video. As a result, real-time transmission is not an option because the delay associated with generating multiple variations of the content is too long. The second major problem is that network characteristics are likely to change over time. Therefore, choosing a specific pre-transcoded variation at one time instant under current network conditions cannot hold for the entire duration.

Despite these disadvantages, the standard will not specify how to fill the fields in these description schemes. These are encoder issues for the MPEG-7 standard.

Assuming a non-real-time transmission application, we describe a system to generate the contents of high-level fields in the description scheme syntax using low-level descriptors.

Variations of Content

Essentially, the same methods that are used for real-time transcoding can also be used to generate summaries and variations of a particular video. Off-line, various network conditions can be simulated, and program content can be transcoded according to the various simulated conditions. The resulting content can be stored in a database. In executing this pre-transcoding, not only should the network conditions, such as available bandwidth be noted, but the system should also note the way in which the data are manipulated. This type of information will populate the fields of the description scheme.

High-Level Meta-Data Encoder for Video Programs

Figure 13:
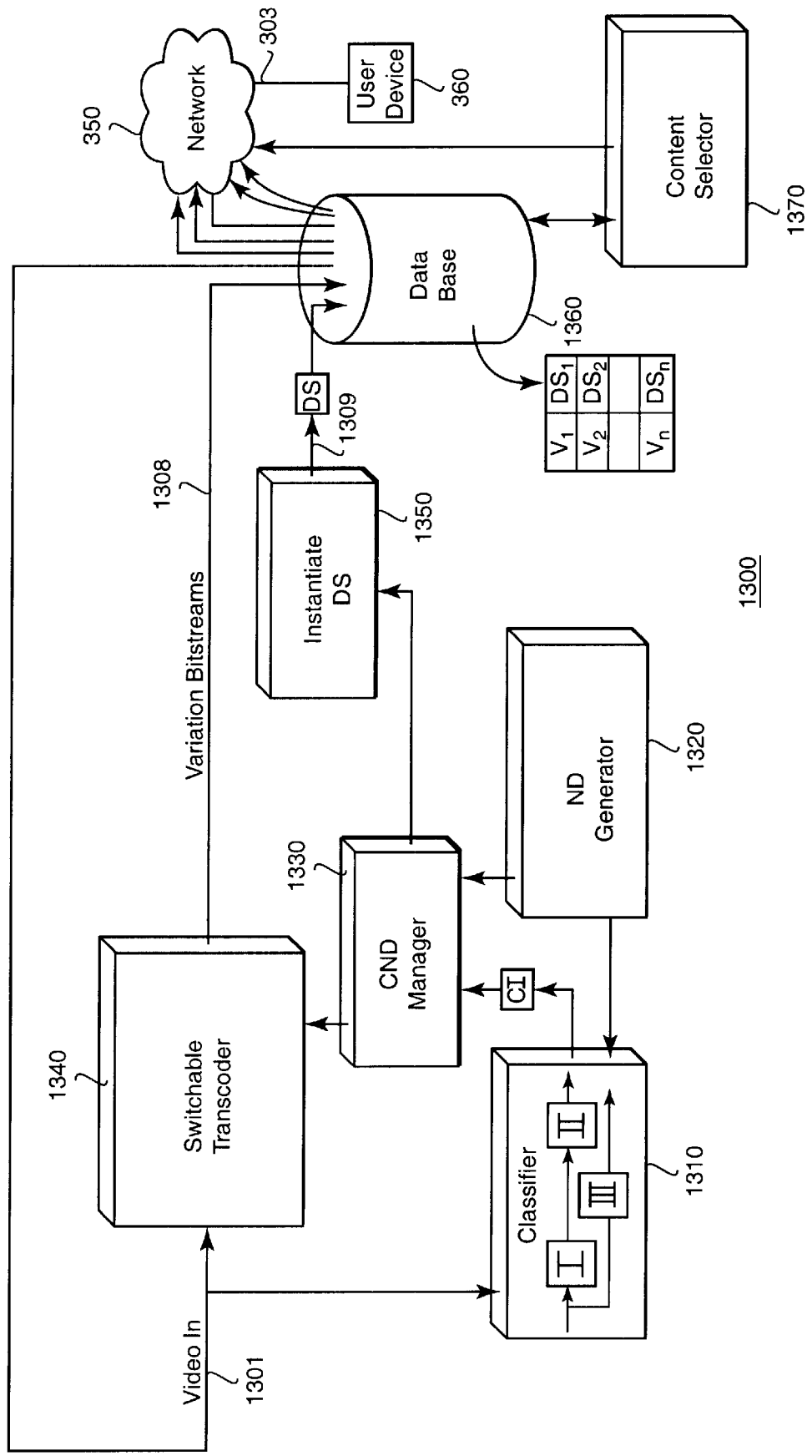
FIG. 13 is a block diagram of a system for generating content summaries and variations of content according to the content summaries.

An illustration of such an encoder that generates summaries and variation data along with associated instantiations of corresponding description schemes is shown in FIG. 13. The components of the encoder resembles those of the adaptable transcoding system 300 of FIG. 3. However, the encoder is different in that it is not connected to a network to receive and transmit in real-time while transcoding. Instead, the encoder is connected to a database where video are stored. The encoder generates, off-line, various versions of the video for later real-time delivery.

As shown in FIG. 13, an adaptable bitstream video delivery system 1300 is includes five major components: a content classifier 1310, a network-device (ND) generator 1320, a CND manager 1330, a switchable transcoder 1340 and a DS instantiator 1350. The system 1300 has its input and output connected to a database 1360. The system 1300 also includes a selector 1370 connected to the network and the database 1360.

An object of the delivery system 1300 is to generate variation and/or summary bitstreams 1308 from an original compressed bitstream (Video In) 1301. The content of the bitstream can be visual, audio, textual, natural, synthetic, primitive, data, compound, or combinations thereof.

As noted earlier, the video delivery system 1300 resembles the adaptable transcoder system 300. The major difference are that it is not connected to a user device 360 via the network 350 of FIG. 3, and the transcoding is not performed in real-time. The ND generator 1350 replaces the device and network.

Essentially, the generator is responsible for simulating network and device (ND) constraints such as would exist in a real-time operation. For instance, the ND generator can simulate a CBR channel with 64 kbps, 128 kbps and 512 kbps, or a VBR channel. Additionally, the generator can simulate a channel that is experiencing a decrease in available bandwidth. This loss can be linear, quadratic, or very sharp. Many other typical conditions can be considered as well; some conditions can relate to user device constraints, such as limited display capabilities.

Each of these different conditions can result in a different variation of the original input video 1301. In essence, the database will store a large number of variations of the input bitstream 1301, so that in the future, a bit stream for some real-time operating condition will be readily available to the downstream transcoders. The variation bitstreams can be both CBR and VBR.

The purpose of the ND generator 1320 is to simulate various network-device conditions and to generate the variations/summaries 1308 of the original content 1301 in an automatic way according to these conditions. While doing this, the system also instantiates corresponding description schemes 1309. Because the fields of the description scheme (e.g., VariationDS and SummaryDS) need to be filled with properties of the variation bitstream 1308 and the method that has been imposed to manipulate it, the CND manager must pass this information to the DS Instantiator 1350. After a variation has been instantiated, the corresponding description scheme can be accessed and used, for example, by the real-time transcoder 300 as described above.

Rate-Quality Functions

Figure 14:
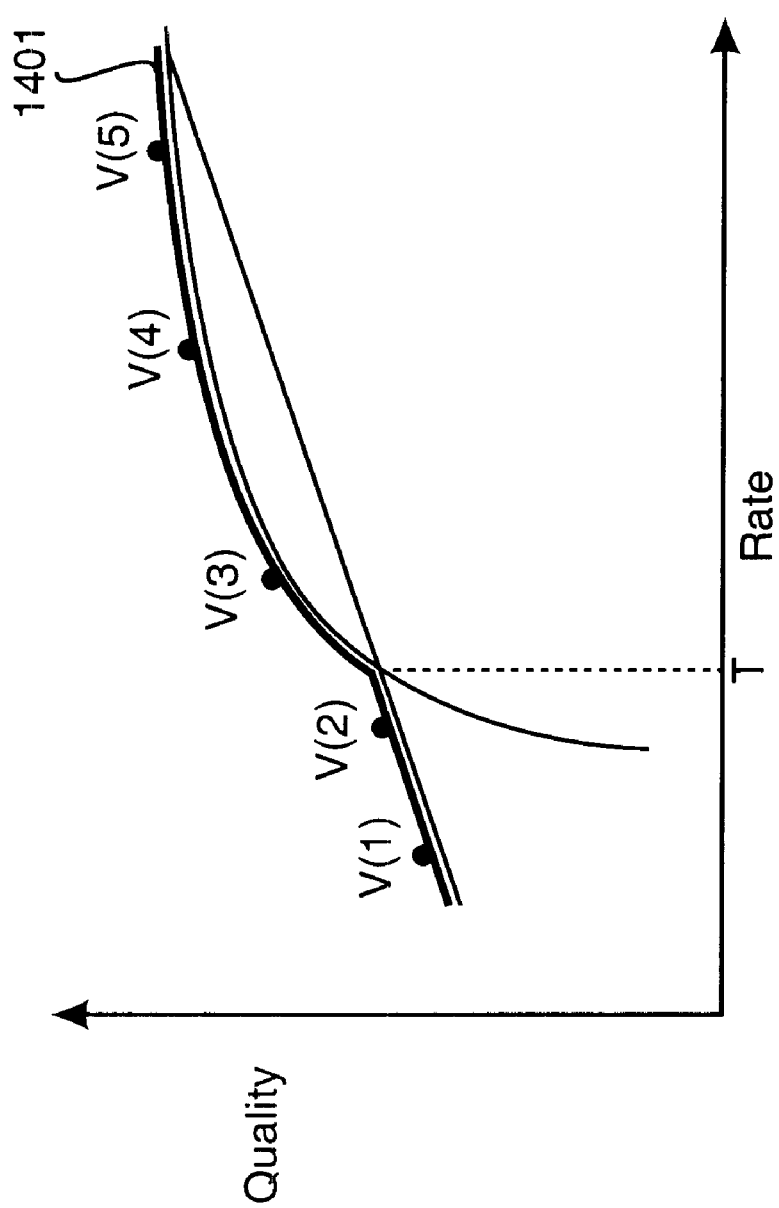
FIG. 14 is graph of transcoding functions based on the content summaries and content variations of FIG. 13.

As shown in FIG. 14, the variations and/or summaries 1308 that are produced by the system 1300 are a subset of points V(1), . . . , V(5) on an optimal rate-quality function 1401. In FIG. 14, a finite number of points are shown. These points represent the optimal operating point for particular variations. Each variation has an associated instantiated description scheme (DS) 1309. Both the variation bitstreams 1308 and the instantiated description schemes 1309 are stored in the database 1360, along with the original video stream 1301.

In a typical application, the selector 1370 of system 1300 receives a request for a particular video program. In response, the selector provides information on the available variations and associated DS stored in the database 1360. The CND manager of the transcoder 300 makes use of this pre-transcoded data. The high-level meta-data allows the transcoder to associate a particular variation of the requested video with current real-time network and device constraints. If a suitable match is found, then the CND manager requests that particular variation to be transmitted over the network 350 by the selector. If a suitable match is found, then the transcoder 340 can operate in a by-pass mode. If close match is found, then the transcoder 340 can operate more efficiently.

This is only one practical example application. It is also possible to further manipulate and alter the already manipulated bitstreams 1308 to increase the match with current network and device constraints. This becomes a matter of generating a large number of pre-transcoded bitstreams that cover a very wide range of conditions versus generating a few pre-transcoded bitstreams that cover some of the most common conditions. Different levels of quality can be expected from each approach because transcoding by the delivery system 1300 under relaxed time constraints will generally lead to a better quality video.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for transcoding a compressed video, comprising the steps of:

partitioning the compressed video into a plurality of hierarchical levels;

extracting features from each of the plurality of hierarchical levels;

selecting one of a plurality of conversion modes of a transcoder dependent on the features extracted from each of the plurality of hierarchical levels; and transcoding the compressed video according to the selected conversion mode.

2. The method of claim 1 wherein the plurality of hierarchical levels include a program level, a shot level, a frame level, and sub-region level.

3. The method of claim 1 wherein the frame level includes video object planes.

4. The method of claim 1 wherein the features depend on semantics and syntactics of the compressed video.

5. The method of claim 1 wherein the compressed video includes low-level meta-data, and further comprising the step of:

mapping the low-level meta-data to rate-quality characteristics depending on content of the video.

6. The method of claim 5 wherein the rate-quality characteristics are partitioned into a plurality of classes.

7. The method of claim 6 including a first class where spatial quality is less than temporal quality, a second class where spatial quality is greater than temporal quality, and a third class where spatial quality is equal to temporal quality.

8. The method of claim 7 wherein content of the first class is transcoded with a discrete-summary transcoder, content of the second class is transcoded with a continuous-conversion transcoder at a relatively low frame rate, and content of the third class is transcoded with the continuous-conversion transcoder at a relatively high frame rate.

9. The method of claim 8 wherein the relatively low frame rate is less than ten frames per second, and the relatively high frame rate is greater than twenty frames per second.

10. The method of claim 6 including a first class where content is easy to compress, a second class where content is moderately difficult to compress, and a third class where content is difficult to compress.

11. The method of claim 10 wherein content of the first class is transcoded with a continuous-conversion transcoder at a relatively high frame rate, content of the second class is transcoded with a continuous-conversion transcoder at a moderate frame rate, and content of the third class is transcoded with the continuous-conversion transcoder at a relatively low high frame rate.

12. The method of claim 11 where the relatively high frame is greater than twenty frames per second, the moderate frame rate is between twenty and ten frames per second, the relatively low fame rate is less than ten frames per second.

13. The method of claim 5 wherein the low-level meta-data is based on a priority of content of the video.

14. The method of claim 5 wherein the low-level meta-data is based on a shape parameters of content of the video.

15. The method of claim 5 wherein the low-level meta-data is based on a texture of content of the video.

16. The method of claim 5 wherein the low-level meta-data is based on motion activity of content of the video.

17. The method of claim 5 wherein the low-level meta-data is based on a DCT coefficients of content of the video.

18. The method of claim 5 wherein high-level meta-data are encoded from low-level meta-data.

19. The method of claim 6 wherein the plurality of classes are ranked on a numeric scale.

20. The method of claim 1 wherein the transcoding produces a CBR bit stream.

21. The method of claim 1 wherein the transcoding produces a VBR bit stream.

22. The method of claim 1 further comprising steps of:

generating a descriptor scheme from the low-level meta-data; and generating a variation of the compressed input bitstream according to the descriptor scheme.

23. The method of claim 1 wherein the transcoding is based on features extracted from a selected one of the hierarchical levels.

24. The method claim 23 wherein the features depend on spatial importance.

25. The method claim 23 wherein the features depend on temporal importance.

26. The method claim 23 wherein the features depend on compression difficulty.

* * * * *